US009657588B2

(12) United States Patent
Panicker et al.

(10) Patent No.: US 9,657,588 B2
(45) Date of Patent: May 23, 2017

(54) METHODS AND SYSTEMS TO MONITOR HEALTH OF ROTOR BLADES

(71) Applicant: General Electric Company, Schenectady, NY (US)

(72) Inventors: Mahesh Raveendranatha Panicker, Bangalore (IN); Ajay Kumar Behera, Bangalore (IN); Venkatesh Rajagopalan, Bangalore (IN); Venkatarao Ryali, Bangalore (IN); Vivek Venugopal Badami, Schenectady, NY (US); Budhaditya Hazra, Kitchener (CA)

(73) Assignee: General Electric Company, Niskayuna, NY (US)

( * ) Notice: Subject to any disclaimer, the term of this patent is extended or adjusted under 35 U.S.C. 154(b) by 729 days.

(21) Appl. No.: 14/140,634

(22) Filed: Dec. 26, 2013

(65) Prior Publication Data

US 2015/0184536 A1 Jul. 2, 2015

(51) Int. Cl.
*G06F 11/30* (2006.01)
*G21C 17/00* (2006.01)
*F01D 21/00* (2006.01)

(52) U.S. Cl.
CPC ........ *F01D 21/003* (2013.01); *F05D 2260/80* (2013.01); *F05D 2270/304* (2013.01); *F05D 2270/80* (2013.01)

(58) Field of Classification Search
CPC ........... G05B 23/0221; G05B 23/0245; G05B 23/0235; F01D 21/003; F05D 2270/304;
(Continued)

(56) References Cited

U.S. PATENT DOCUMENTS 5,152,172 A 10/1992 Leon et al.
5,206,816 A 4/1993 Hill et al.
(Continued)

FOREIGN PATENT DOCUMENTS

DE 10065314 A1 7/2002

OTHER PUBLICATIONS

Lackner, "Vibration and Crack Detection in Gas Turbine Engine Compressor Blades Using Eddy Current Sensors", Thesis (S.M.)—Massachusetts Institute of Technology, Dept. of Aeronautics and Astronautics, in Partial fulfilment of the Degree of Master of Science in Aeronautics and Astronautics, Sep. 2004, 97 Pages.
(Continued)

*Primary Examiner* — Roy Y Yi
(74) *Attorney, Agent, or Firm* — Nitin N. Joshi

(57) ABSTRACT

A system for monitoring health of a rotor is presented. The system includes a processing subsystem that generates a measurement matrix based upon a plurality of resonant-frequency first delta times of arrival vectors corresponding to a blade and a first sensing device, and a plurality of resonant-frequency second delta times of arrival vectors corresponding to the blade and a second sensing device, generates a resonant matrix based upon the measurement matrix such that entries in the resonant matrix are substantially linearly uncorrelated and linearly independent, and generates a resonance signal using a first subset of the entries of the resonant matrix, wherein the resonance signal substantially comprises common observations and components of the plurality of resonant-frequency first delta times of arrival vectors and the plurality of resonant-frequency second delta times of arrival vectors.

20 Claims, 15 Drawing Sheets

(58) Field of Classification Search
CPC ............ F05D 2270/80; F05D 2230/80; F05D 2260/80; G01N 29/043; G01N 2291/044; G01N 29/262; G01N 2291/106; G01N 2291/267; G01N 29/07; G01N 2291/2694; G01N 29/04; G01N 29/2418; G01N 29/30; G01N 29/4427; G01N 29/4436; G01N 29/4472; G01N 21/01
USPC ........................................................ 702/183
See application file for complete search history.

(56) References Cited

U.S. PATENT DOCUMENTS

| | | | |
|---|---|---|---|
| 5,686,669 A | 11/1997 | Hernandez et al. | |
| 5,974,882 A | 11/1999 | Heath | |
| 7,841,237 B2 * | 11/2010 | Suzuki .................. | G01N 29/07 73/584 |
| 7,941,281 B2 | 5/2011 | Rai et al. | |
| 8,532,939 B2 | 9/2013 | Bhattacharya et al. | |
| 8,543,341 B2 | 9/2013 | Rajagopalan et al. | |
| 8,676,514 B2 | 3/2014 | Rajagopalan et al. | |
| 8,718,953 B2 | 5/2014 | Rajagopalan et al. | |
| 2010/0030493 A1 | 2/2010 | Rao | |
| 2010/0161245 A1 * | 6/2010 | Rai ...................... | F01D 21/003 702/35 |
| 2011/0213569 A1 | 9/2011 | Zielinski et al. | |
| 2012/0212214 A1 | 8/2012 | Roylance et al. | |
| 2012/0278004 A1 | 11/2012 | Rajagopalan et al. | |
| 2013/0082833 A1 | 4/2013 | Rajagopalan et al. | |
| 2014/0119889 A1 | 5/2014 | Prabhu et al. | |
| 2014/0188430 A1 | 7/2014 | D'Souza et al. | |

OTHER PUBLICATIONS

Bhattacharya et al., "System to Monitor Blade Health in Axial Flow Compressors", IEEE Conference on Prognostics and Health Management (PHM), Jun. 20-23, 2011, 7 Pages.

Rajagopalan et al., "Estimation of Static Deflection Under Operational Conditions for Blade Health Monitoring", IEEE Conference on Prognostics and System Health Management (PHM), May 23-25, 2012, MU3165, 6 Pages.

* cited by examiner

METHODS AND SYSTEMS TO MONITOR HEALTH OF ROTOR BLADES

BACKGROUND

Rotor blades or airfoils are used in many devices with several examples including axial compressors, turbines, engines, or other turbo machinery. For example, an axial compressor has one or more rotors having a series of stages with each stage comprising a row of rotor blades or airfoils followed by a row of static blades or static airfoils. Accordingly, each stage comprises a pair of rotor blades or airfoils and static airfoils. Typically, the rotor blades or airfoils increase the kinetic energy of a fluid that enters the axial compressor through an inlet. Furthermore, the static blades or static airfoils generally convert the increased kinetic energy of the fluid into static pressure through diffusion. Accordingly, the rotor blades or airfoils and static airfoils increase the pressure of the fluid.

During operation, the rotor blades generally vibrate at synchronous and asynchronous frequencies. For example, while the rotor blades may generally vibrate at the synchronous frequencies due to the rotor speed/frequency, the rotor blades may vibrate at the asynchronous frequencies due to aerodynamic instabilities, such as, rotating stall and flutter. The rotor blades have a natural tendency to vibrate at larger amplitudes at certain synchronous frequencies of the rotor blades. Such synchronous frequencies are referred to as resonant frequencies of the rotor blades. The synchronous frequencies of the rotor blades are typically activated at fixed rotor speeds of the rotors. Furthermore, the activation of the resonant frequencies may increase the amplitudes of vibration of the rotor blades. Such increased amplitudes of vibration may damage the rotor blades or lead to cracks in the rotor blades.

The rotor blades operate for long hours under extreme and varied operating conditions, such as, high speed, pressure, and temperature that affect the health of the airfoils. In addition to the extreme and varied operating conditions, certain other factors lead to fatigue and stress of the airfoils. The factors, for example, may include inertial forces including centrifugal force, pressure, resonant frequencies of the airfoils, vibrations in the airfoils, vibratory stresses, temperature stresses, reseating of the airfoils, load of the gas or other fluid, or the like. A prolonged increase in stress and fatigue over a period of time damages the rotor blades resulting in defects or cracks in the rotor blades. Such defects, damages, or cracks in the rotor blades may vary the rotor speeds that activate the rotor blades' resonant frequencies. For example, in a healthy rotor blade if resonant frequencies are activated at a rotor speed R, then when the rotor blade has a crack, the resonant frequencies may get activated at a rotor speed of R±r. These variations in rotor speeds that activate the rotor blades' resonant frequencies may, therefore, be useful in monitoring the health of rotor blades.

Accordingly, it is desirable to determine rotor speeds that activate resonant frequencies of healthy rotor blades. Furthermore it is desirable to determine existence of variations in the rotor speeds that activate resonant frequencies to monitor and assess the health of the rotor blades.

BRIEF DESCRIPTION

These and other drawbacks associated with such conventional approaches are addressed here by providing, in various embodiments, a system for monitoring health of a rotor is presented. The system includes a processing subsystem that generates a measurement matrix based upon a plurality of resonant-frequency first delta times of arrival vectors corresponding to a blade and a first sensing device, and a plurality of resonant-frequency second delta times of arrival vectors corresponding to the blade and a second sensing device, generates a resonant matrix based upon the measurement matrix such that entries in the resonant matrix are substantially linearly uncorrelated and linearly independent, and generates a resonance signal using a first subset of the entries of the resonant matrix, wherein the resonance signal substantially comprises common observations and components of the plurality of resonant-frequency first delta times of arrival vectors and the plurality of resonant-frequency second delta times of arrival vectors.

A method is presented. The method includes steps of generating a measurement matrix based upon a plurality of resonant-frequency first delta times of arrival vectors corresponding to a blade and a first sensing device, and a plurality of resonant-frequency second delta times of arrival vectors corresponding to the blade and a second sensing device, generating a resonant matrix based upon the measurement matrix such that entries in the resonant matrix are substantially linearly uncorrelated and linearly independent, and generating a resonance signal using a first subset of the entries of the resonant matrix, wherein the resonance signal substantially comprises common observations and components of the plurality of resonant-frequency first delta times of arrival vectors and the plurality of resonant-frequency second delta times of arrival vectors.

DRAWINGS

These and other features, aspects, and advantages of the present invention will become better understood when the following detailed description is read with reference to the accompanying drawings, wherein:

FIG. 9(*b*) shows a simulated plot of a resonance signal of a blade;

FIG. 12 (*b*) shows a simulated plot of a resonant-frequency second delta times of arrival vectors signal corresponding to a blade and a second sensing device;

FIG. 12 (*c*) shows a simulated plot of a sub-cleaned resonant-frequency delta TOAs vectors signal generated using a row of a whitened matrix;

FIG. 12 (*d*) shows a simulated plot of a semi-noise signal generated using another row of the whitened matrix referred to in FIG. 12(*c*);

FIG. 12 (*e*) shows a simulated plot of a resonance signal;

FIG. 12 (*f*) shows a simulated plot of a noise signal; and

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

As used herein, the term "expected time of arrival (TOA)" may be used to refer to a TOA of a blade, during rotation, at a reference position when there are no defects or cracks in the blade and the blade is working in an ideal situation, load conditions are optimal, and the vibrations in the blade are minimal. As used herein, the term "resonant-frequency rotor speeds" refers to speeds, of a rotor of a device, that result in activation of one or more resonant frequencies of blades in the rotor.

In operation, natural frequencies or resonant frequencies of blades in a rotor get activated at certain rotor speeds of a rotor in a device, such as an axial compressor. Hereinafter the phrase "speeds of the rotor that result in activation of the resonant-frequencies of the blades" are referred to as resonant-frequency rotor speeds. As discussed in detail below, the present systems and methods identify resonant-frequency rotor speeds of the blades based upon times of arrival (TOAs) (hereinafter referred to as actual TOAs) of the blades at a reference position in the rotor. One or more cracks in the blades may vary the resonant-frequency rotor speeds of the blades. A technical effect of the present system and method according to one embodiment is to determine one or more variations in the resonant-frequency rotor speeds, and determine existence of cracks or probability of existence of cracks in the blades based upon the variations. This technical effect provides for enhanced maintenance prognostics and a lower percentage of unplanned downtime.

Figure 1:
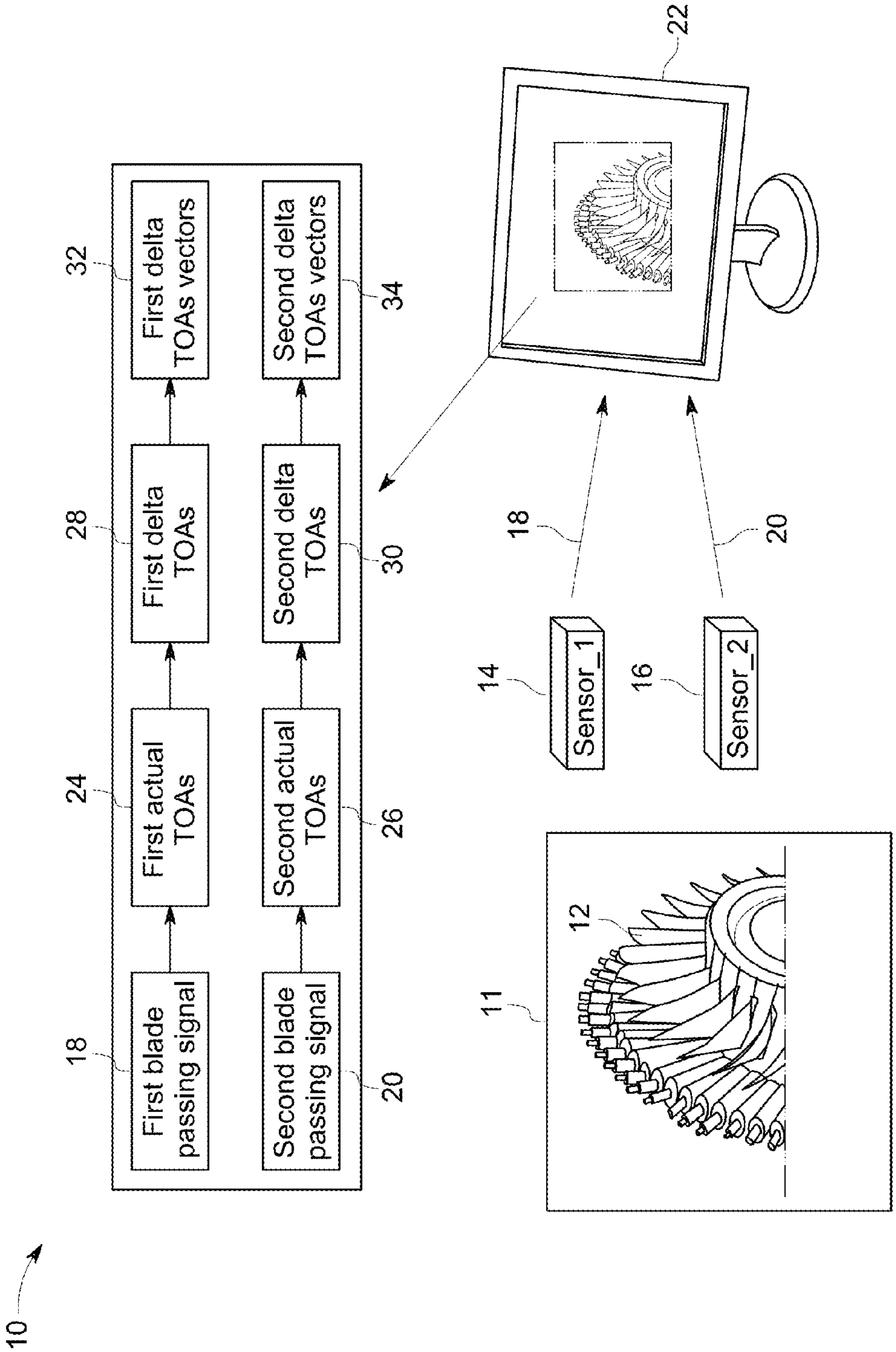
FIG. 1 is a diagrammatic illustration of a blade health monitoring system, in accordance with an embodiment of the present systems.

FIG. 1 is a diagrammatic illustration of a blade health monitoring system 10, in accordance with an embodiment of the present system. As shown in FIG. 1, the system 10 includes one or more blades or airfoils, in a rotor 11, that are monitored by the system 10 to determine existence of cracks or probability of existence of cracks in the blades. It is noted that FIG. 1 shows a portion of the rotor 11. The rotor 11, for example may be a component of device, such as, a compressor, an axial compressor, a land based gas turbine, or the like. The rotor 11, for example includes a blade 12. For ease of understanding, the present systems and techniques are explained with reference to the blade 12, however, the present systems and techniques are applicable to each of the blades in the rotor 11. As shown in the presently contemplated configuration, the system 10 includes one or more sensors 14, 16 that sense an arrival of the blade 12 at a reference point to generate blade passing signals BPS 18, 20 representative of times of arrival (TOAs) 24, 26 of the blade 12 at the reference point. Hereinafter, the phrase "TOAs of a blade at a reference point" are referred to as actual TOAs. For example, the first sensing device 14 generates the first BPS 18 representative of first actual TOAs 24 of the blade 12 at the reference point. For example, the second sensing device 16 generates the second BPS 20 representative of second actual TOAs 26 of the blade 12 at the reference point. The reference point, for example, may be underneath the sensors 14, 16 or adjacent to the sensors 14, 16. The actual TOAs, for example, may be measured in units of time or degrees. The BPS 18, 20, for example, may be generated during a start-up state of the rotor, a transient state of the rotor 11, a steady state of the rotor 11, over-speed state of the rotor 11, or combinations thereof.

In one embodiment, the sensors 14, 16 may sense an arrival of the leading edge of the blade 12 to generate the BPS 18, 20. In another embodiment, the sensors 14, 16 may sense an arrival of the trailing edge of the blade 12 to generate the BPS 18, 20. In still another embodiment, the sensor 14 may sense an arrival of the leading edge of the blade 12 to generate the BPS 18, and the sensor 16 may sense an arrival of the trailing edge of the blade 12 to generate the BPS 20, or vice versa. The sensors 14, 16, for example, may be mounted adjacent to the blade 12 on a stationary object in a position such that an arrival of the blade 12 may be sensed efficiently. In one embodiment, at least one of the sensors 14, 16 is mounted on a casing (not shown) of the blades. By way of a non-limiting example, the sensors 14, 16 may be magnetostriction sensors, magnetic sensors, capacitive sensors, eddy current sensors, or the like.

As illustrated in the presently contemplated configuration, the BPS 18, 20 are received by a processing subsystem 22. The processing subsystem 22 determines the first actual TOAs 24 and the second actual TOAs 26 of the blade 12 based upon the BPS 18, 20. Particularly, the processing subsystem 22 determines the first actual TOAs 24 based upon the first BPS 18, and the processing subsystem 22 determines the second actual TOAs 26 based upon the second BPS 20. In certain embodiments, the processing subsystem 22 preprocesses the first actual TOAs 24 and the second actual TOAs 26 to remove noise and asynchronous frequencies from the first actual TOAs 24 and the second actual TOAs 26. The processing subsystem 22, for example, may preprocess the first actual TOAs 24 and the second actual TOAs 26 by applying at least one of a smoothening filtering technique and a median filtering technique on the first actual TOAs 24 and the second actual TOAs 26. In one example, the processing subsystem 22 includes at least one processor that is coupled to memory and a communications section. The information such as sensor data can be communicated by wired or wireless mechanisms via the communications section and stored in memory for the subsequent processing. The memory in one example can also include the executable programs and associated files to run the application.

Furthermore, the processing subsystem 22 monitors the health of the blade 12 based upon the first actual TOAs 24 and the second actual TOAs 26. The processing subsystem 22 determines first delta TOAs 28, corresponding to the blade 12 and corresponding to the first sensing device 14, based upon the first actual TOAs 24 and an expected TOA of the blade 12. Additionally, the processing subsystem 22 determines second delta TOAs 30, corresponding to the blade 12 and the corresponding to the second sensing device 16, based upon the second actual TOAs 26 and the expected TOA of the blade 12. The first delta TOAs 28 correspond to the first sensing device 14 as the first delta TOAs are determined based upon the first actual TOAs 24 determined based upon the first BPS 18 generated by the first sensing device 14. The second delta TOAs 30 correspond to the second sensing device 16 as the second delta TOAs 30 are determined based upon the second actual TOAs 26 determined based upon the second BPS 20 generated by the second sensing device 16. The first delta TOAs 28 or the second delta TOAs 30 may be determined using the following equation (1):

$$\text{DeltaTOA}=\text{ActualTOA}-\text{ExpectedTOA} \quad (1)$$

In one embodiment, the first delta TOAs 28 may be represented as first delta TOAs vectors 32 by mapping the first delta TOAs 28 to corresponding rotor speeds of the rotor 11. In another embodiment, the second delta TOAs may be represented as second delta TOAs vectors 34 by mapping the second delta TOAs 30 to corresponding rotor speeds of the rotor 11. For example, if a first actual TOA is generated based upon a BPS generated at a time stamp $T_1$ when the rotor speed is $R_1$, then a first delta TOA is determined based upon the first actual TOA; and the first delta TOA is represented as a first delta TOA vector by mapping the first delta TOA to the rotor speed $R_1$. Hereinafter, the phrase "first delta TOAs" and "first delta TOAs signal" are interchangeably used as first delta TOAs are digital representation of the analog first delta TOAs signal. Furthermore, the phrase "second delta TOAs" and "second delta TOAs signal" are interchangeably used as second delta TOAs are digital representation of the analog second delta TOAs signal. Additionally, the phrase "first delta TOAs vectors" and "first delta TOAs vectors signal" are interchangeably used as first delta TOAs vectors are digital representation of the analog first delta TOAs vectors signal. Additionally, the phrase "second delta TOAs vectors" and "second delta TOAs vectors signal" are interchangeably used as the second delta TOAs vectors are digital representation of the analog first delta TOAs vectors signal.

It is noted that the rotor 11 operates at multiple rotor speeds. A subset of the rotor speeds activates the resonant frequencies of the blades in the rotor 11. The 'rotor speeds of the rotor that activate the resonant frequencies of the blades' are hereinafter referred to as resonant-frequency rotor speeds. It is noted that the resonant-frequency rotor speeds of blades in a rotor may be different from resonant-frequency rotor speeds of blades in another rotor. Furthermore, it is noted that the resonant-frequency rotor speeds of a blade in the rotor 11 may be different from resonant frequency rotor speeds of another blade in the rotor 11.

In the embodiment of FIG. 1, the processing subsystem 22 extracts resonant-frequency first delta TOAs/resonant-frequency first delta TOAs vectors from the first delta TOAs 28/first delta TOAs vectors 32, respectively. The resonant-frequency first delta TOAs/resonant-frequency first delta TOAs vectors are a subset of the first delta TOAs 28/first delta TOAs vectors 32, respectively. Additionally, the processing subsystem 22 extracts resonant-frequency second delta TOAs/resonant-frequency second delta TOAs vectors from the second delta TOAs 30/the second delta TOAs vectors 34, respectively. The resonant-frequency second delta TOAs/resonant-frequency second delta TOAs vectors are a subset of the second delta TOAs 30/the second delta TOAs vectors 34, respectively. In one embodiment, the processing subsystem 22 determines resonant-frequency rotor speeds of the blade 12 based upon the resonant-frequency first delta TOAs and the resonant-frequency second delta TOAs. In another embodiment, the processing subsystem 22 determines resonant-frequency rotor speeds of the blade 12 based upon the resonant-frequency first delta TOAs vectors and the resonant-frequency second delta TOAs vectors.

Additionally, the processing subsystem 22 determines existence of any variations in the resonant-frequency rotor speeds with respect to historical resonant-frequency rotor speeds to determine the existence of a crack in the blade 12 or a probability of existence of a crack in the blade 12. When the processing subsystem 22 determines that one or more variations exist in the resonant-frequency rotor speeds of the blade 12, the processing subsystem 22 determines that a crack in the blade 12 exists, or determines that a probability of crack in the blade 12 exists. The determination of crack in the blade 12 is explained in greater detail with reference to FIG. 7.

Figure 2:
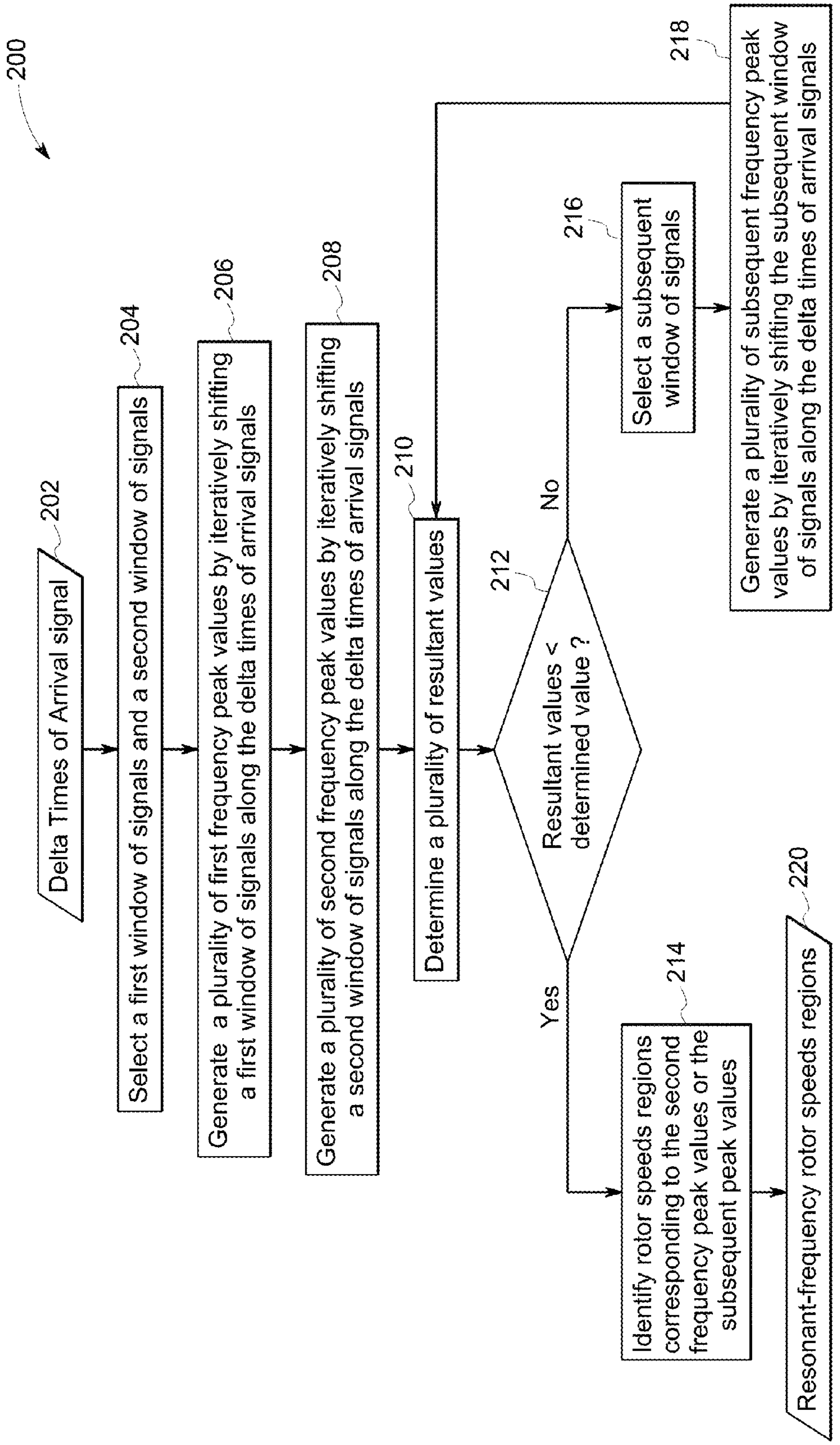
FIG. 2 is a flow chart illustrating an exemplary method to identify resonant-frequency rotor speeds regions of the blade based upon delta TOAs, in accordance with certain aspects of the present techniques.

FIG. 2 is a flow chart illustrating an exemplary method 200 to identify resonant-frequency rotor speed regions 220 of the blade 12 based upon delta TOAs 220, in accordance with certain aspects of the present techniques. The resonant-frequency rotor speed regions 220 are broad ranges of rotor speeds of the blade 12 that result in activation of one or more resonant frequencies of the blade 12. For example, resonant frequencies of the blade 12 may get activated at rotor speeds in the range of 1200 rotations per minute to 1400 rotation per minute, therefore 1200 rotations per minute to 1400 rotation per minute is a resonant-frequency rotor speed range of the blade.

Figure 3:
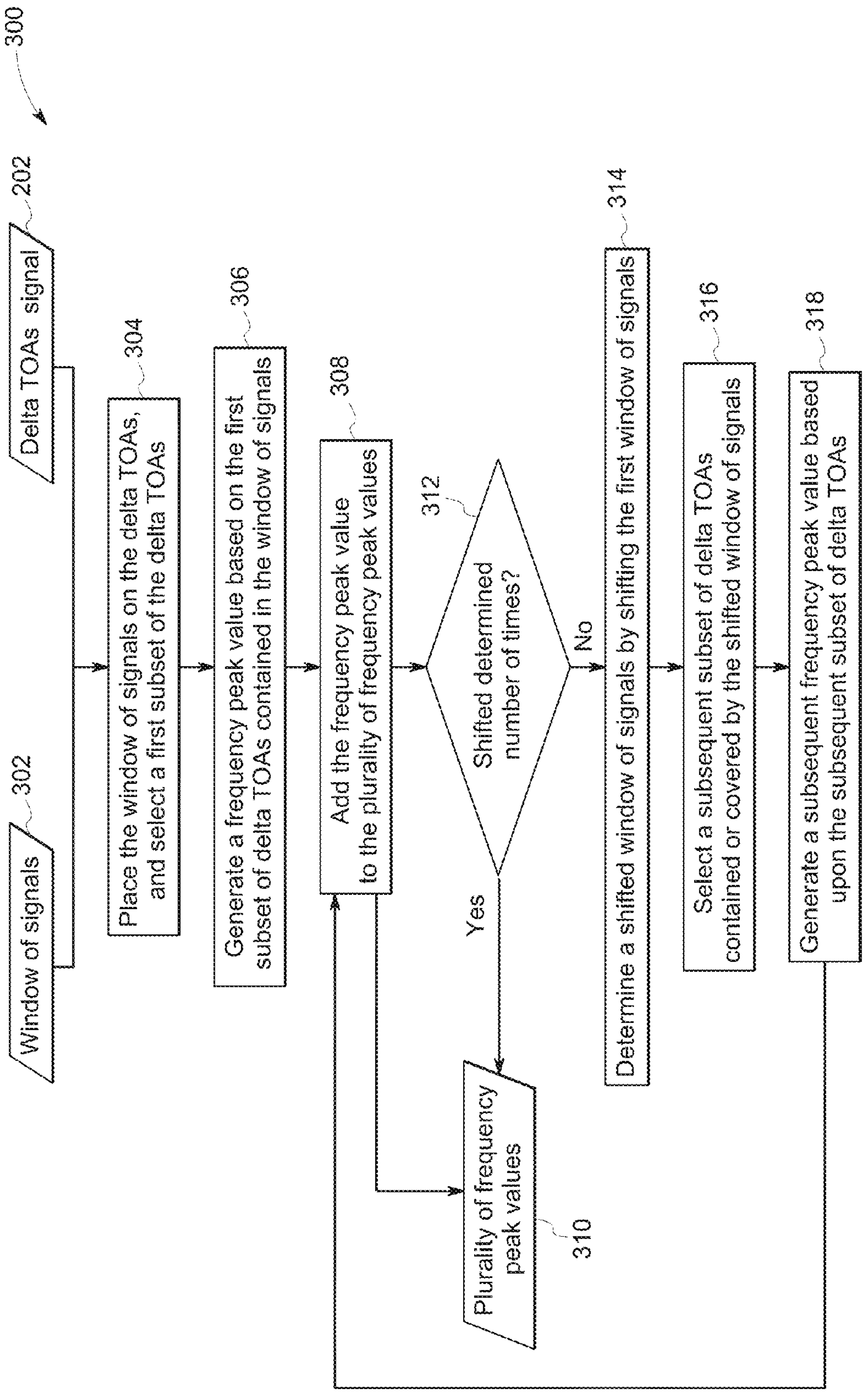
FIG. 3 is a flow chart illustrating an exemplary method to determine a plurality of frequency peak values by shifting a window of signals along delta TOAs signals, in accordance with one aspect of the present techniques.

Reference numeral 202 is representative of delta TOAs corresponding to the blade 12. The delta TOAs 202 are determined based upon actual TOAs generated by the first sensing device 14 or the second sensing device 16 when there are no defects or cracks in the blade 12; the blade 12 and the rotor 11 are working in an ideal situation, load conditions are optimal, and the vibrations in the blade 12 are minimal. In one embodiment, the delta TOAs 202 may be the first delta TOAs 28 (see FIG. 1) if the first actual TOAs 24 are generated by the first sensing device 14 when there are no defects or cracks in the blade 12; the blade 12 and the rotor 11 are working in an ideal situation, load conditions are optimal, and the vibrations in the blade 12 are minimal. In another embodiment, the delta TOAs 202 may be the second delta TOAs 30 (see FIG. 1) if the second actual TOAs 26 are generated by the second sensing device 16 when there are no defects or cracks in the blade 12; the blade 12 and the rotor 11 are working in an ideal situation, load conditions are optimal, and the vibrations in the blade 12 are minimal. In one embodiment, the delta TOAs signals 202 may be represented as delta TOAs vector signals by mapping the delta TOAs signals 202 to respective rotor speeds. An exemplary delta TOAs vector signal is shown in FIG. 3. In the embodiment of FIG. 2, each block of the method 200 is executed by the processing subsystem 22 of FIG. 1.

At block 204, a first window of signals and a second window of signals are selected. The first window of signals and the second window of signals are rotor speed bands. Additionally, each of the first window of signals and second window of signals has a respective width. For example, in the embodiment of FIG. 2, the first window of signals is a rotor speed band of 25 rotations per minute, and a width of the first window of signals is 25 rotations per minute. Again in the embodiment of FIG. 2, the second window of signals is a rotor speed band of 50 rotations per minute, and a width of the second window of signals is 50 rotations per minute. The width of the second window of signals is greater than the width of the first window of signals.

At block 206, a plurality of first frequency peak values are generated by iteratively shifting the first window of signals along the delta TOAs signal 202. At block 208, a plurality of second frequency peak values are generated by iteratively shifting the second window of signals along the delta TOAs signal 202. Determination of the first frequency peak values and the second frequency peak values are explained in greater detail with reference to FIG. 3 and FIG. 4.

At block 210, a plurality of resultant values are determined based upon the first frequency peak values and the second frequency peak values. Particularly, a resultant value is determined by subtracting a second frequency peak value from a respective first frequency peak value. A resultant value, for example, may be determined using the following equation (2):

$$RV=First\_Frequnecy\_Peak\_Value-Second\_Frequnecy\_Peak\_Value \qquad (2)$$

where RV is a resultant value.

At block 212, a check is carried out to determine whether the resultant values are less than a determined value. At block 212, when the resultant values are less than the determined value, the control is transferred to block 214. At block 214, rotor speeds corresponding to the second frequency peak values are determined. A local maxima of the rotor speeds corresponding to the second frequency peak values are determined as the resonant-frequency rotor speeds regions 220, when the resultant values are less than the determined value. For example, when a rotor speed corresponding to a second frequency peak value is 1200 rotation per minute, then a local maxima of 1200±50 is determined as a resonant-frequency rotor speed region.

Figure 6:
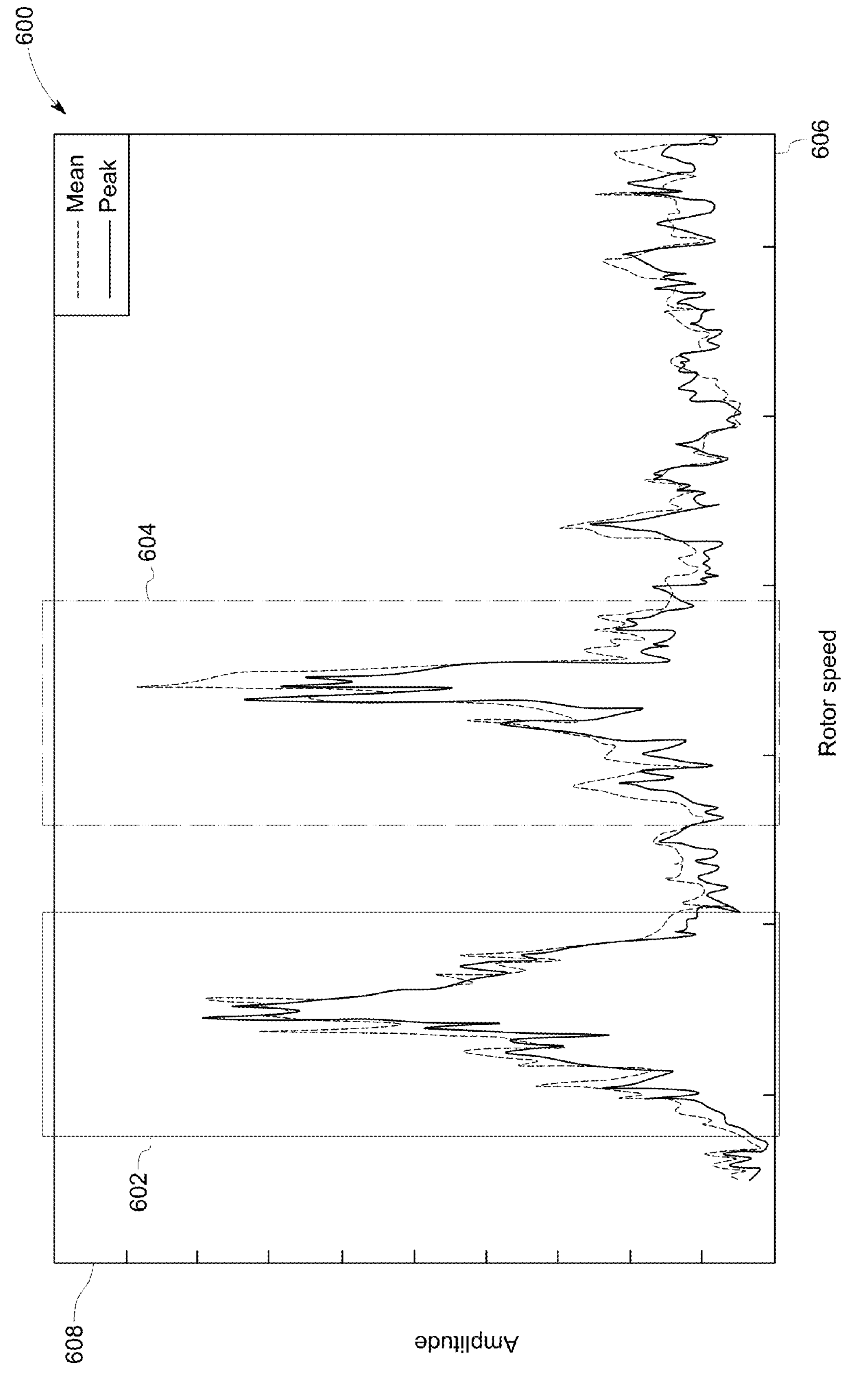
FIG. 6 is a simulated plot of resonant-frequency rotor speed regions of a blade, in accordance with one embodiment of the present techniques.

However, with returning reference to block 212, when the resultant values are not less than the determined value, the control is transferred to block 216. At block 216, a subsequent window of signals is selected. A width of the subsequent window of signals is greater than the width of the first window of signals and the width of the second window of signals. For example, by way of a non-limiting example, the width of the subsequent window of signals may be 75 rotations per minute or greater than 75 rotations per minute. Furthermore, at block 218, a plurality of subsequent frequency peak values are determined by iteratively shifting the subsequent window of signals along the delta TOAs 202. The determination of the subsequent frequency peak values by iteratively shifting the subsequent window of signals along the delta TOAs signal 202 is explained with reference to FIG. 3 and FIG. 4. Furthermore, the control is transferred to block 210. At block 210, a plurality of subsequent resultant values are determined based upon the subsequent frequency peak values and previous frequency peak values. In one embodiment, the previous frequency peak values are the second frequency peak values. Again at block 212, a check is carried out to determine whether one or more of the subsequent resultant values are less than the determined value. When at block 212, the subsequent resultant values are not less than the determined value, blocks 216 to 212 are executed again. However at block 212, when the subsequent resultant values are less than the determined value, the control is transferred to block 214. At block 214, a local maxima of each of the rotor speeds corresponding to the subsequent frequency peak values is identified as the resonant-frequency rotor speeds region 220. For example, if r is a rotor speed corresponding to a subsequent frequency peak value, then r±50 may be selected as a resonant-frequency rotor speed region. FIG. 6 shows simulated resonant-frequency speed regions of a blade identified by using a process described with reference to FIG. 2.

FIG. 3 is a flow chart illustrating an exemplary method 300 to determine a plurality of frequency peak values 310 by shifting a window of signals 302 along the first delta TOAs signals 202 referred to in FIG. 1, in accordance with one aspect of the present techniques. Particularly, FIG. 3 explains blocks 206, 208, and 218 of FIG. 2 in greater detail. The plurality of frequency peak values 310, for example, may be the first frequency peak values when the window of signals 302 is the first window of signals referred to in FIG. 2. Similarly, the plurality of frequency peak values 310 may be the second frequency peak values when the window of signals 302 is the second window of signals referred to in FIG. 2. Again, the plurality of frequency peak values 310 may be the subsequent frequency peak values when the window of signals 302 is the subsequent window of signals. (See FIG. 2).

At block 304, the window of signals 302 is placed on the delta TOAs 202, and a first subset of the delta TOAs 202 contained or covered by the window of signal 302 is selected. Furthermore, at block 306, a frequency peak value is generated based upon the first subset of the delta TOAs signal 202. For example, the frequency peak value is generated by determining a frequency signal by taking a fast Fourier transform of the first subset of the delta TOAs signal 202, and selecting the frequency peak value from the frequency signal, wherein the frequency peak value is equal to or less than a determined synchronous frequency threshold. As used herein, the term "determined synchronous frequency threshold" is a numerical frequency value selected such that frequencies, greater than the determined synchronous frequency threshold, substantially are asynchronous frequencies; and frequencies, equal to or less than the determined synchronous frequency threshold, substantially are synchronous frequencies. By way of a non-limiting example, the magnitude of the determined synchronous frequency threshold may be about 2 Hertz. Determination of the frequency peak value is explained in greater detail with reference to FIG. 5.

Furthermore, at block 308, the frequency peak value is added to the plurality of frequency peak values 310, and the control is transferred to block 312. At block 312, a check is carried out to determine whether the window of signals 302 has been shifted a determined number of times along the delta times of signals 202. While in FIG. 3, a check is carried out to determine whether the window of signals 302 has been shifted a determined number of times, in certain embodiment a check may be carried out to determine whether the window of signals 302 has been shifted across the delta times of arrival 202. At block 312, when it is determined that the window of signals 302 has not been shifted, along the first delta TOAs signal 202, a determined number of times; the control is transferred to block 314. At block 314, a shifted window is determined by shifting the window of signals 302 along the delta TOAs signal 202 by a determined rotor speed band. Furthermore, at block 316, a subsequent subset of the delta TOAs signal 202, contained or covered by the shifted window of signals is selected. At block 318, a subsequent frequency peak value based upon the subsequent subset of the delta TOAs signal 202 is determined. The subsequent frequency peak value, for example, is generated by taking a fast Fourier transform of the subsequent subset of the first delta TOAs signal 202 to generate a corresponding frequency signal, followed by selecting the subsequent frequency peak value from the frequency signal, wherein the subsequent frequency peak value is equal to or less than the determined synchronous frequency threshold. The control from the block 318 is transferred to block 308. At block 308, the subsequent frequency peak value is added to the plurality of frequency peak values 310. Subsequently, at block 312, the check is carried out to determine whether the window of signals 302 has been shifted, a determined number of times, along the delta TOAs signal 202. At block 312, when it is determined that the window of signals 302 has been shifted the determined number of times, the plurality of frequency peak values 310 are determined.

Figure 4:
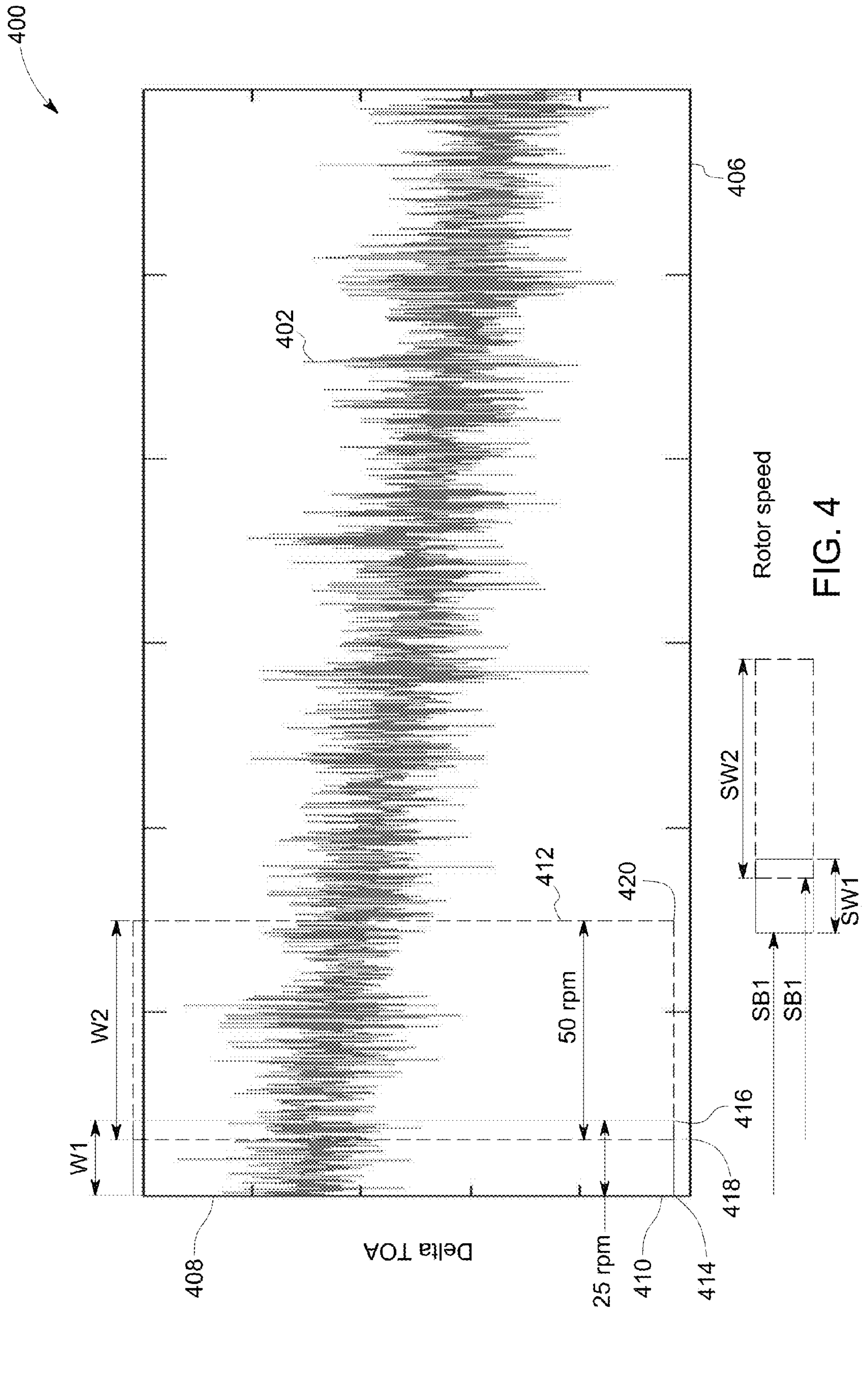
FIG. 4 is a plot of a simulated delta TOAs vector signal, corresponding to a blade in a rotor, to show determination of a plurality of frequency peak values and resultant values.

FIG. 4 is a plot 400 of a simulated delta TOAs vector signal 402, corresponding to a blade in a rotor, to show determination of a plurality of frequency peak values and resultant values. In one embodiment, FIG. 4 explains steps 206, 208 and 218 of FIG. 2 in greater detail. Furthermore, FIG. 4 explains step 210 of FIG. 2. Additionally, FIG. 4 explains step 306 of FIG. 3 in greater detail. The simulated delta TOAs vector signal 402 is generated by mapping delta TOAs, of a blade in a rotor, to respective rotor speeds. In one embodiment, the delta TOAs vector signal 402 may be the first delta TOAs vector signal 32 (see FIG. 1). In another embodiment, the delta TOAs vector signal 402 may be the second delta TOAs vector signal 34 (see FIG. 1).

Figure 5:
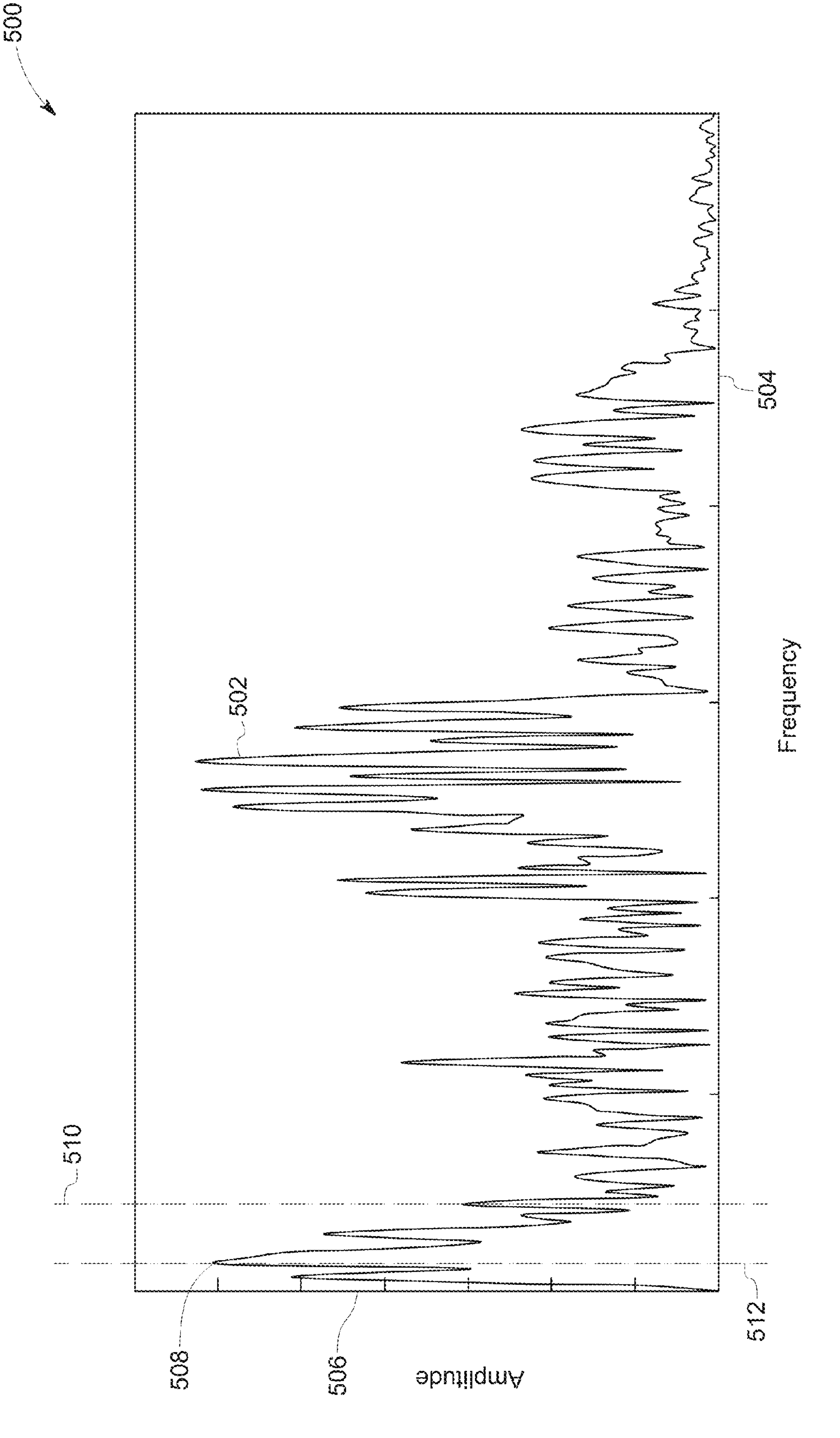
FIG. 5 is a simulated plot of a frequency signal to explain determination of a first frequency peak value based upon the frequency signal and the determined synchronous frequency threshold.

X-axis 406 of the plot 400 represents rotor speeds of the rotor, and Y-axis 408 of the plot 400 represents delta TOAs corresponding to the blade. Reference numeral 410 is representative of a first window of signals having a width $W_1$, and reference numeral 412 is representative of a second window of signals having a width $W_2$. The first window of signals 410 selects a first subset of the delta TOAs vector signal 402 contained or covered by the first window of signals 410. As shown in FIG. 4, the first subset of the delta TOAs vector signal 402 starts at a point 414 and ends at a point 416. Furthermore, a frequency signal 502 shown in FIG. 5 is generated based upon the first subset of the delta TOAs vector signal 402. The frequency signal 502 is determined by taking a Fourier transform or a Fast Fourier transform of the first subset of the delta TOAs vectors signal 402. Furthermore, a first frequency peak value 508 (shown in FIG. 5), corresponding to the first window of signals 410 and the first subset of the delta TOAs vectors signal 402, is determined based upon the frequency signal 502 and a determined synchronous frequency threshold 510 (shown in FIG. 5). The determination of the first frequency peak value, corresponding to the first window and the first subset of the delta TOAs, is explained in greater detail with reference to FIG. 5.

The second window of signals 412 selects a second subset of the delta TOAs vector signal 402 contained or covered by the second window of signals 412. As shown in FIG. 4, the second subset of the delta TOAs vector signal 402 starts at a point 418 and ends at a point 420. Furthermore, a frequency signal is generated based upon the second subset of the delta TOAs vector signal 402. The frequency signal is determined by taking a Fourier transform or a Fast Fourier transform of the second subset of the delta TOAs vector signal. Furthermore, a second frequency peak value, corresponding to the second window of signals 412 and the second subset of the delta TOAs, is determined based upon the frequency signal and a determined synchronous frequency threshold. The second frequency peak value, for example, may be determined using the method explained with reference to FIG. 5. Furthermore, a first resultant value is determined by subtracting the second frequency peak value from the first frequency peak value.

Subsequently, the first window of signals 410 is shifted by a rotor speed band $SB_1$ to generate a shifted first window $SW_1$, and the second window 412 is shifted by the rotor speed band $SB_1$ to generate a shifted second window of signals $SW_2$. Again subsequent first frequency peak value, corresponding to the shifted first window of signals $SW_1$, is determined based upon a subset of the delta TOAs vector signal 402 covered by the shifted first window of signals $SW_1$. Additionally, subsequent second frequency peak value, corresponding to the shifted second window of signals $SW_2$, is determined based upon a subset of the delta TOAs vector signal 402 covered by the shifted second window of signals $SW_2$. Furthermore, a second resultant value is determined by subtracting the subsequent second frequency peak value from the subsequent first frequency peak value.

The first window of signals 410 and the second window of signals 412 are shifted unless the delta TOAs vector signal 402 is traversed completely. Furthermore, a plurality of first frequency peak values, a plurality of second frequency peak values, and a plurality of resultant values are determined by shifting the first window of signals 410, and the second window of signals 412. The plurality of first frequency peak values includes the first frequency peak value, and the subsequent first frequency peak. The plurality of second frequency peak values includes the second frequency peak value, and the subsequent second frequency peak. Furthermore, the plurality of resultant values includes the first resultant value and the second resultant value.

FIG. 5 is a plot 500 of the frequency signal 502 referred to in FIG. 4 to explain determination of the first frequency peak value 508 based upon the frequency signal 502 and a determined synchronous frequency threshold 510. X-axis 504 of the plot 500 represents frequency of the first subset of the delta TOAs vector signal 402, and Y-axis 506 of the plot 500 represents amplitude of the frequency. The first frequency peak value 508, for example, is determined by the processing subsystem 22 referred to in FIG. 1. The processing subsystem 22 selects frequencies that are less than the determined synchronous frequency threshold 510. The selected frequencies are synchronous frequencies. It is noted that selection of the frequencies, that are less than the determined synchronous frequency threshold 510, from the frequency signal 502 results in selection of synchronous frequencies from the frequency signal 502. Furthermore, a frequency that has the highest amplitude is selected from the synchronous frequencies or the selected frequencies. In the embodiment of FIG. 5, a frequency 512 has the highest amplitude 508. The highest amplitude 508 is determined as the first frequency peak value 508.

FIG. 6 is a simulated plot 600 of resonant-frequency rotor speed regions 602, 604 of a blade determined using the method explained with reference to FIG. 2. X-axis 606 is representative of rotor speeds of a rotor, and Y-axis is representative of frequency peak values. The frequency peak values may be the second frequency peak values determined at the block 208 in FIG. 2, or the subsequent frequency peak values determined at the block 218 referred to in FIG. 2. As shown in FIG. 6, two resonant-frequency rotor speed regions 602, 604 are identified.

Figure 7:
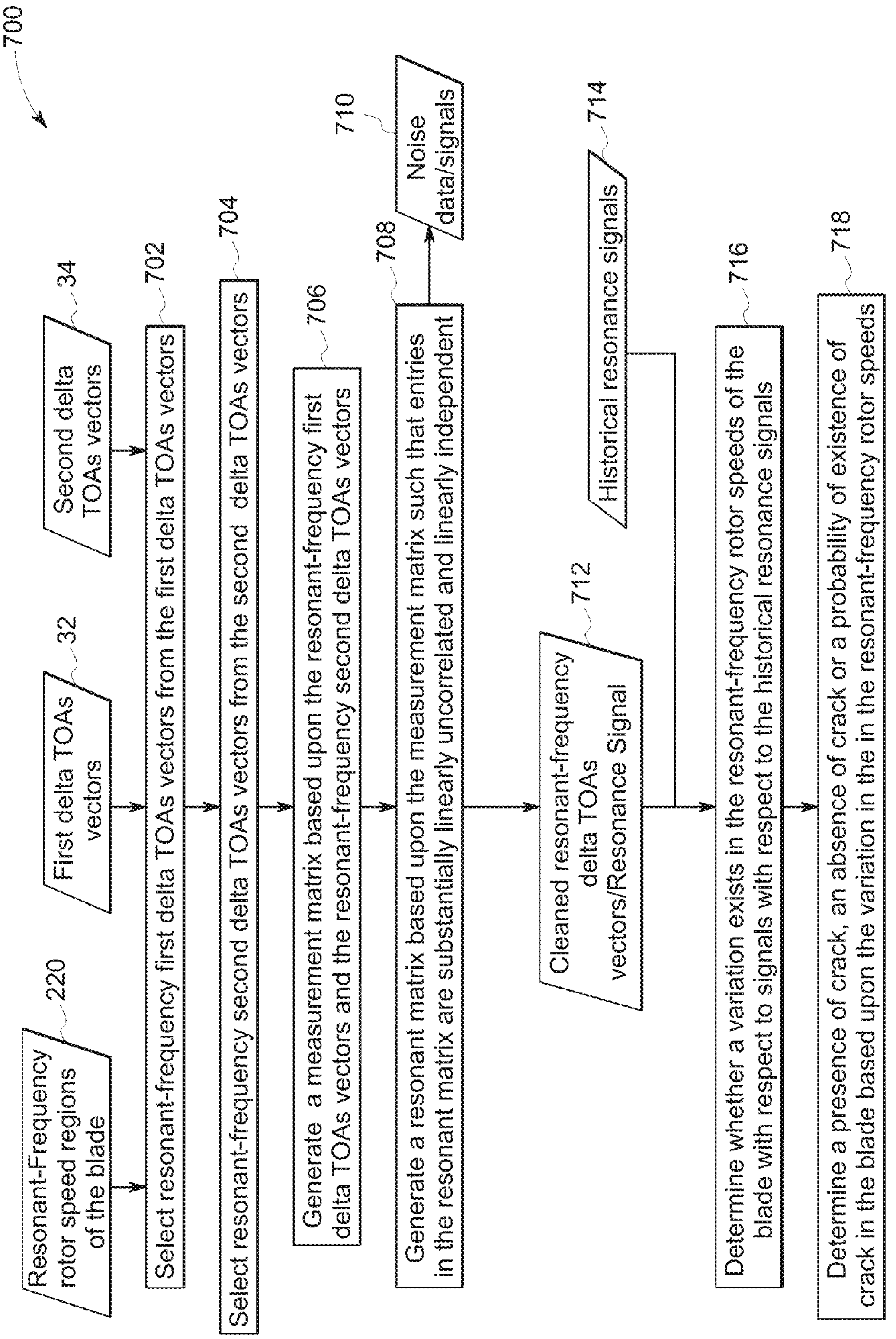
FIG. 7 is a flowchart of a method for monitoring health of a rotor, in accordance with one embodiment of the present techniques.

FIG. 7 is a flowchart of a method 700 for monitoring health of the blade 12 referred to in FIG. 1, in accordance with one embodiment of the present techniques. Reference numeral 220 is representative of the resonant-frequency rotor speeds regions of the blade 12 in the rotor 11 (see FIG. 2). Reference numeral 32 is representative of the first delta TOAs vectors determined by the processing subsystem 22 in FIG. 1. Furthermore, reference numeral 34 is representative of the second delta TOAs vectors determined by the processing subsystem 22 in FIG. 1. At block 702, resonant-frequency first delta TOAs vectors are selected from the first delta TOAs vectors 32. As used herein, the phrase "resonant-frequency first delta TOAs vectors" are used to refer to a subset of the first delta TOAs vectors 32, wherein the subset corresponds to resonant-frequency rotor speeds regions of the blade 12. At block 704, resonant-frequency second deltas TOAs vectors are selected from the second delta TOAs vectors 34. As used herein, the phrase "resonant-frequency second delta TOAs vectors" are used to refer to a subset of the second delta TOAs vectors 34, wherein the subset corresponds to resonant-frequency rotor speeds regions of the blade 12.

Furthermore, at block 706, a measurement matrix is generated based upon the resonant-frequency first delta TOAs vectors and the resonant-frequency second delta TOAs vectors. The measurement matrix, for example may be generated by arranging the resonant-frequency first delta TOAs vectors and the resonant-frequency second delta TOAs vectors to generate an initial matrix, and detrending the initial matrix to generate the measurement matrix. The initial matrix, for example, may be detrended using one or more techniques including a polynomial curve fitting technique, or a wavelet based curve fitting technique. Furthermore, generation of the measurement matrix is explained in greater detail with reference to FIG. 10.

At block 708, a resonant matrix is generated based upon the measurement matrix such that entries in the resonant matrix are substantially linearly uncorrelated and linearly independent. The resonant matrix, for example, may be determined by applying at least one technique on the measurement matrix, wherein the at least one technique comprises a whitening technique, a cumulant matrix estimation technique, and a matrix rotation technique.

Figures 9A, 9B:
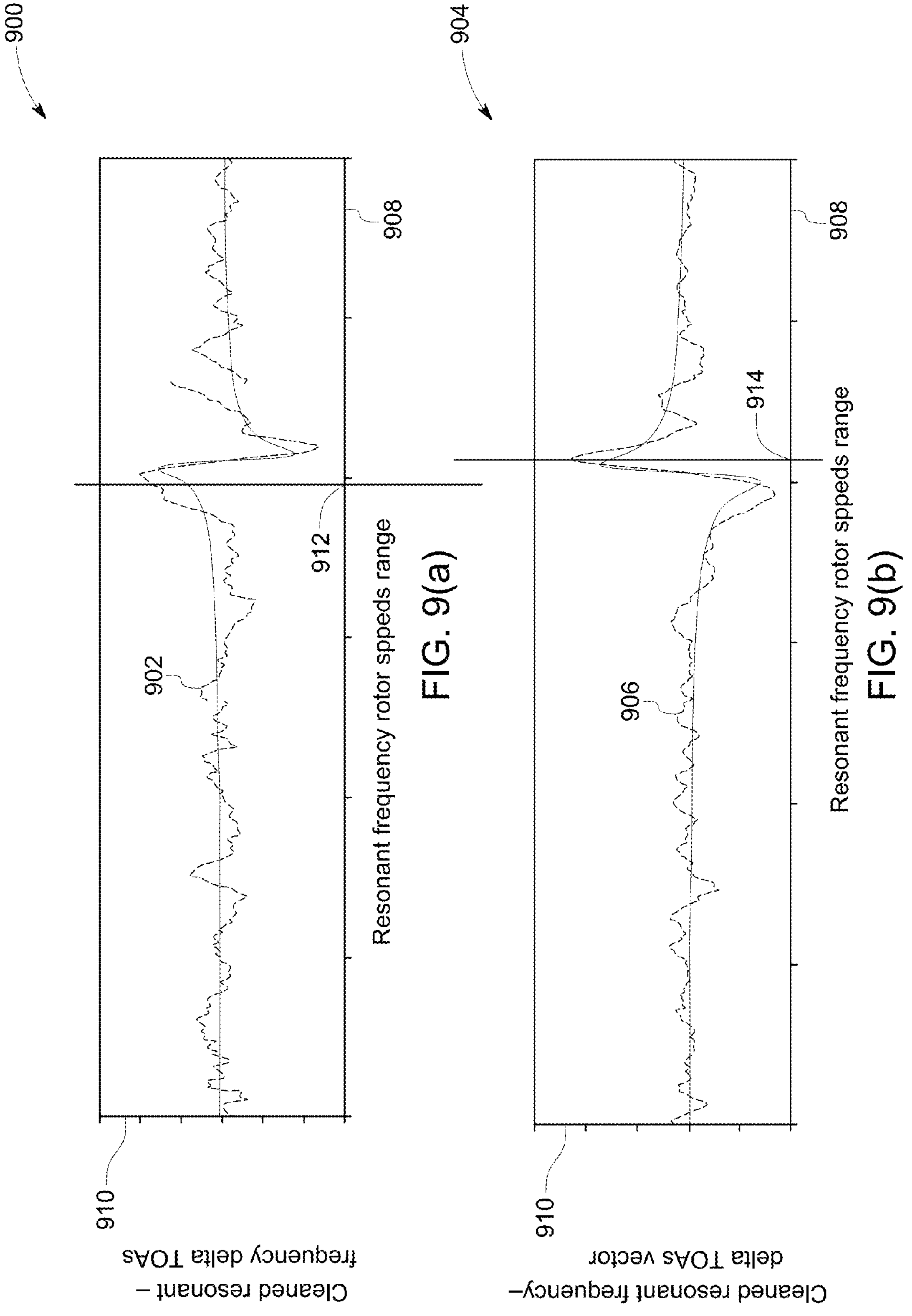
FIG. 9(*a*) shows a simulated plot of a historical resonance signal of a blade.

The resonant matrix comprises cleaned resonant-frequency delta TOAs vectors 712 and noise data 710. Particularly, a row of the resonant matrix comprises the resonant-frequency delta TOAs vectors 712, and another row of the resonant matrix comprises the noise data 714. The cleaned resonant-frequency delta TOAs vector signal 712 includes common observations or measurements of the first sensing device 14 and the second sensing device 16 after removal of noise from the resonant-frequency first delta TOAs vectors signal and the resonant-frequency second delta TOAs vectors signal. For ease of understanding, the term "cleaned resonant-frequency delta TOAs vectors" will be referred to as a resonance signal. Furthermore, the noise signal 710 includes noise of the resonant-frequency first delta TOAs vectors signal and the resonant-frequency second delta TOAs vectors signal. For ease of understanding, the "cleaned resonant-frequency delta TOAs vectors signal 712" are interchangeably referred to as resonance signal 712. An example of a resonance signal using the method of FIG. 7 is shown in FIG. 9(*a*) and FIG. 12(*e*). An example of a noise signal using the method of FIG. 7 is shown in FIG. 12(*f*).

Reference numeral 714 is representative of historical resonance signals, of the blade 12, generated when there are no defects or cracks in the blade 12, and the blade 12 is working in an ideal situation, load conditions are optimal, and the vibrations in the blade 12 are minimal. The historical resonance signals 714 show historical resonant-frequency rotor speeds of the blade 12 mapped to historical cleaned delta TOAs of the blade 12 when there are no defects or cracks in the blade 12.

At block 716, it is determined whether a variation exists in the resonant-frequency rotor speeds of the blade 12 with respect to historical resonant-frequency rotor speeds of the blade 12. For example, the variation in resonant-frequency rotor speeds of the blade 12 with respect to historical resonant-frequency rotor speeds of the blade 12 is determined by applying a correlation function to the resonance signal 712 and the historical resonance signals 714. The application of the correlation function results in determination of an index value and a correlation value. As used herein, the term "correlation value" is a measurement of a correlation or similarity between a resonance signal and a historical resonance signal. As used herein, the term "index value" is a measurement of a phase shift between a resonance signal and a historical resonance signal. Higher the correlation value, higher is the similarity between the resonance signal 712 and the historical resonance signals 714. Again higher the index value, higher is a phase shift in the resonance signal 712 with respect to the historical resonance signals 714. Accordingly, the correlation value and the index value may be used to determine the variation in the resonance signal 712 with respect to the historical resonance signals 714.

Furthermore, at block 718, a presence of crack, an absence of crack or a probability of crack may be determined based upon the variation in the resonance signal 712 with respect to the historical resonance signals 714. For example, when a variation exists in the resonance signal 712 with respect to the historical resonance signals 714, it may be determined that a crack exists in the blade 12. In one embodiment, the presence of crack, the absence of crack or the probability of crack may be determined based upon the index value, the correlation value, and a correlation chart. Determination of the presence of crack, the absence of crack, or the probability of crack based upon the index value, the correlation value and the correlation chart is shown in FIG. 8.

Figure 8:
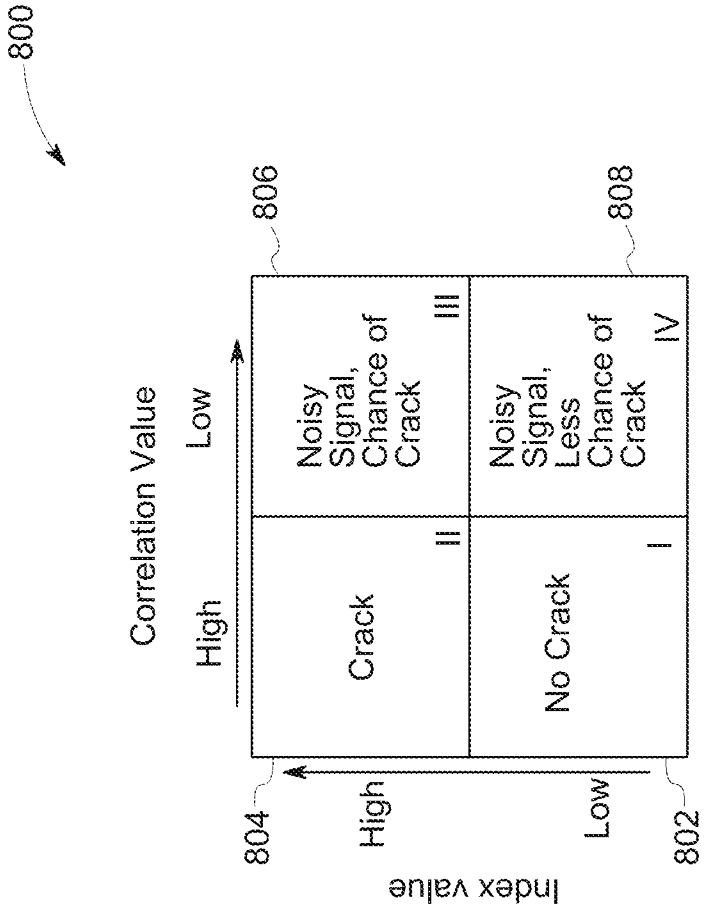
FIG. 8 is a correlation chart, of an index value and a correlation value that may be used to determine the existence of the crack, or a probability of crack in a blade.

FIG. 8 shows a correlation chart 800 that may be used to determine a presence of crack, an absence of crack or a probability of crack in the blade 12, in accordance with one embodiment of the present techniques. In one embodiment, FIG. 8 explains step 718 of FIG. 7. The correlation chart 800 comprises four quadrants including a first quadrant 802, a second quadrant 804, a third quadrant 806, and a fourth quadrant 808. The first quadrant 802 represents low index value and high correlation value. The second quadrant 804 represents high index value and high correlation value. The third quadrant 806 represents high index value and low correlation value. Furthermore, the fourth quadrant 808 represents low index value and low correlation value.

The index value and the correlation value determined at the block 716 in FIG. 7 are positioned in the correlation chart 800 to determine the existence of the crack or a probability of existence of the crack in the blade 12. For example, when the index value and the correlation value fall in the first quadrant 802 of the correlation chart 800, it may be determined that no cracks exist in the blade 12. Furthermore, when the index value and the correlation value, determined at the block 716, fall in the second quadrant 804 of the correlation chart 800, it may be determined that one or more cracks exist in the blade 12. Additionally, when the index value and the correlation value, determined at the block 716, fall in the third quadrant 806 of the correlation chart 800, it may be determined that a probability of existence of a crack exist in the blade 12. Additionally, when the index value and the correlation value, determined at the block 716, fall in the fourth quadrant 808 of the correlation chart 800, it may be determined that a probability of existence of a crack exist in the blade 12.

FIG. 9(*a*) shows a simulated plot 900 of a historical resonance signal 902 of a blade, and FIG. 9(*b*) shows a simulated plot 904 of a resonance signal 906, of the blade, generated using the method explained in FIG. 7. X-axis 908 of the plot 900, 904 is representative of resonant-frequency rotor speeds range, and Y-axis 910 of the plot 900, 904 is representative of cleaned resonant-frequency delta TOAs. As shown by the historical resonance signal 902 in FIG. 9(*a*), when the blade is healthy without cracks and vibrations, the resonance frequency of the blade is activated at a resonant-frequency rotor speed 912. However, as is evident from the resonance signal 906, the resonant frequencies of the blade are activated at a shifted resonant-frequency rotor speed 914. Accordingly, due to the variation or the shift in the resonant-frequency rotor speed 912 of the blade shown by the historical resonance signal 902, it may be determined that the blade has a crack.

Figure 10:
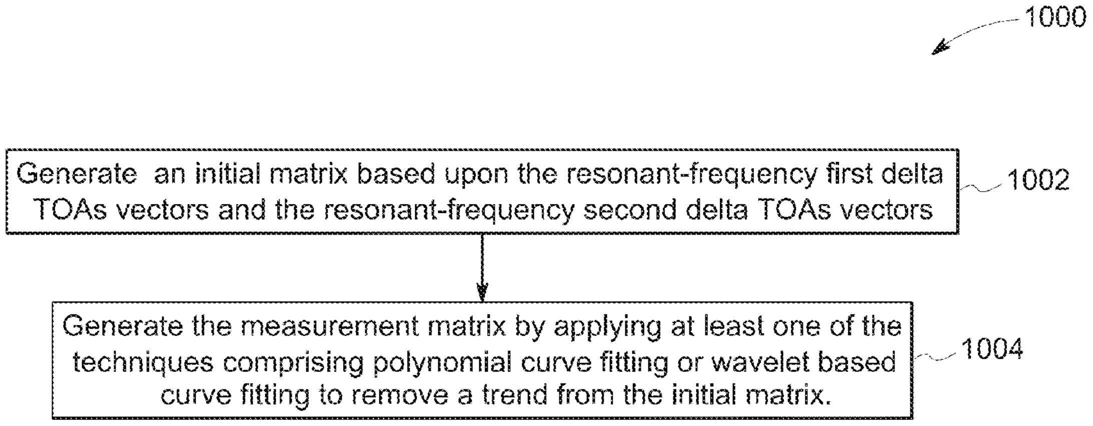
FIG. 10 is a flowchart of a method to generate a measurement matrix based upon a resonant-frequency first delta TOAs and a resonant-frequency second delta TOAs, in accordance with one embodiment of the present techniques.

FIG. 10 is a flowchart of a method 1000 to generate a measurement matrix based upon resonant-frequency first delta TOAs and resonant-frequency second delta TOAs, in accordance with one embodiment of the present techniques. In one embodiment, FIG. 10 explains block 706 of FIG. 7 in greater detail. The resonant-frequency first delta TOAs are selected from the first delta TOAs 32 at the block 702 in FIG. 7. Furthermore, the resonant-frequency second delta TOAs are selected from the second delta TOAs 34 at block 704 in FIG. 7. At block 1002, an initial matrix is generated based upon the resonant-frequency first delta TOAs vectors and the resonant-frequency second delta TOAs. In one embodiment, if $LE_1$ is representative the resonant-frequency first delta TOAs vectors, and $LE_2$ is representative of the resonant-frequency second delta TOAs vectors, then the initial matrix I may be represented as follows:

$$I = \begin{bmatrix} LE_1 \\ LE_2 \end{bmatrix}_{2*n} \tag{3}$$

Furthermore, at block 1004, a measurement matrix may be generated by detrending the initial matrix I. The initial matrix, for example, may be detrended by applying at least one technique on the initial matrix I. The technique, for example includes a polynomial curve fitting, a wavelet based curve fitting, or combinations thereof.

Figure 11:
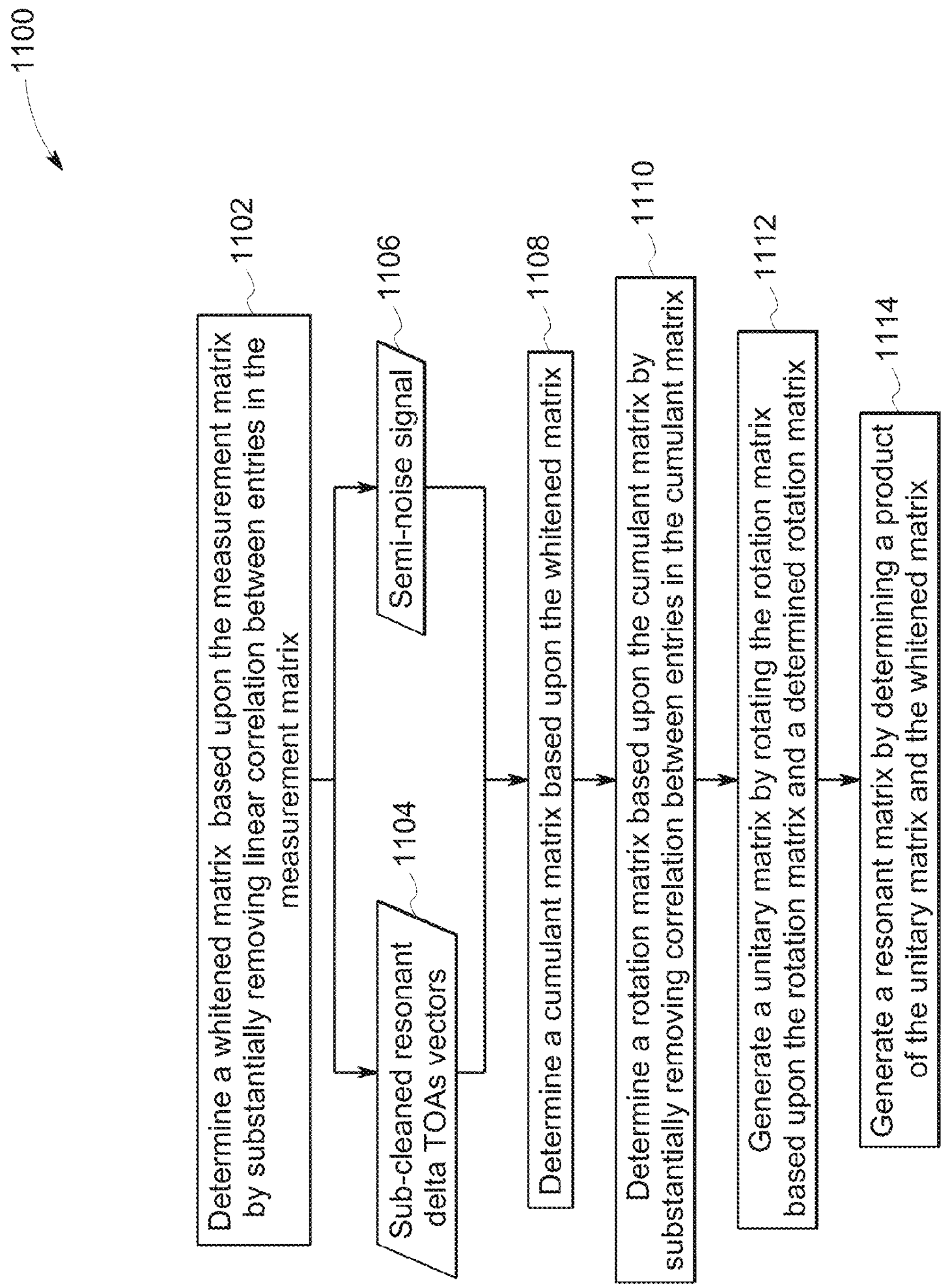
FIG. 11 is a flowchart of a method to generate a resonant matrix based upon a measurement matrix, in accordance with one embodiment of the present techniques.
Figure 12A:
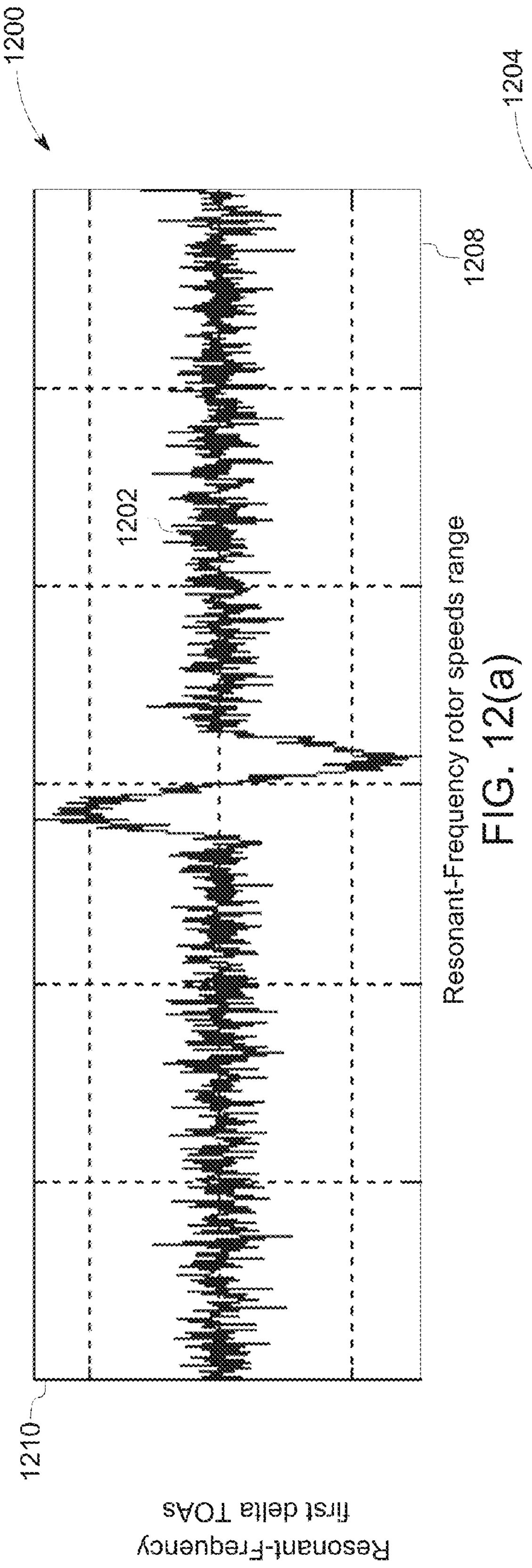
FIG. 12 (*a*) shows a simulated plot of a resonant-frequency first delta times of arrival vectors signal corresponding to a blade and a first sensing device.
Figure 12B:
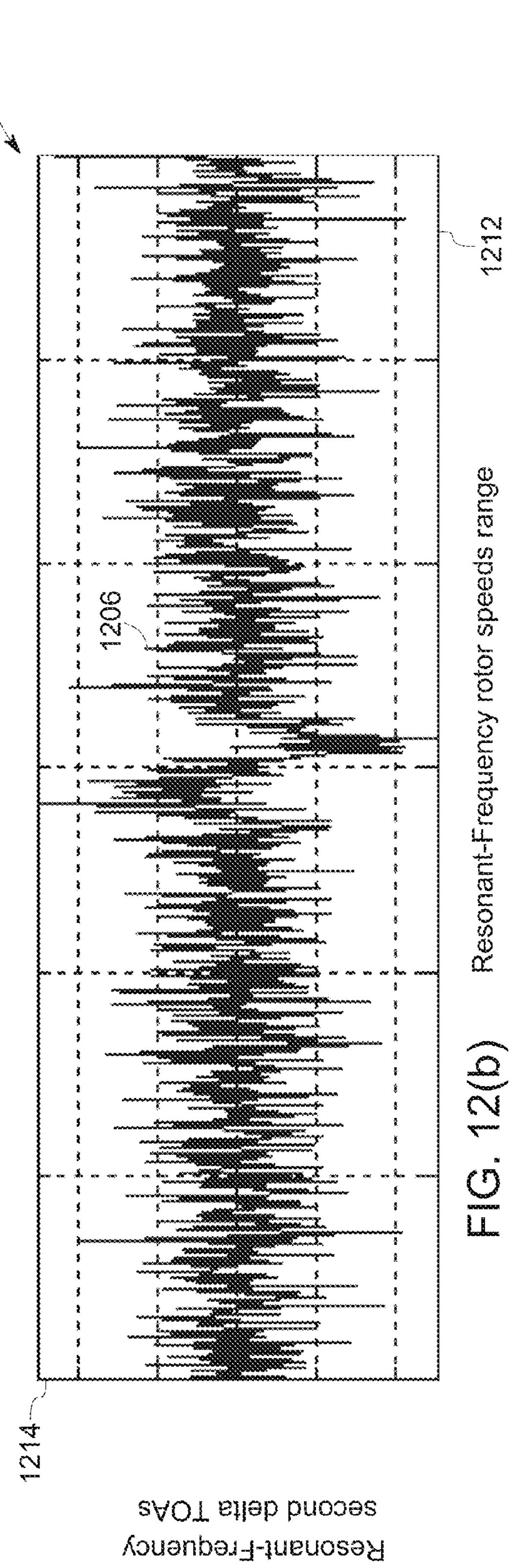
Figure 12C:
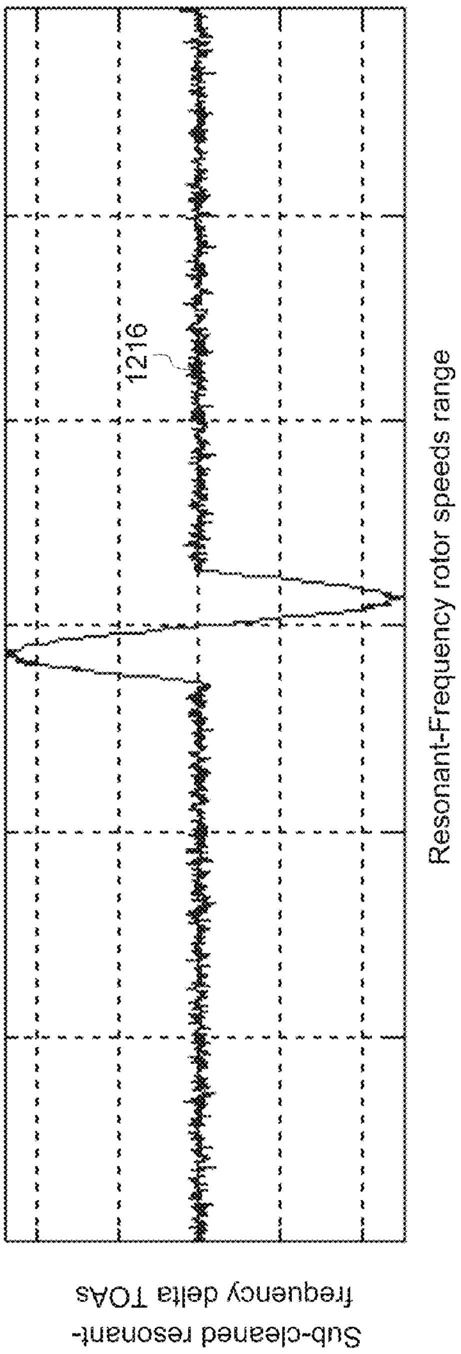
Figure 12D:
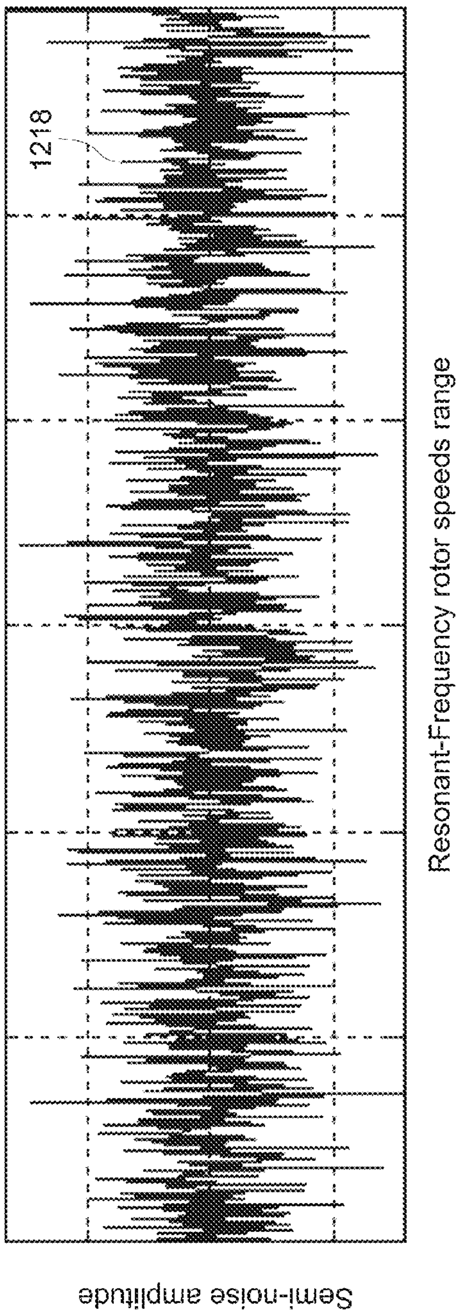
Figure 12E:
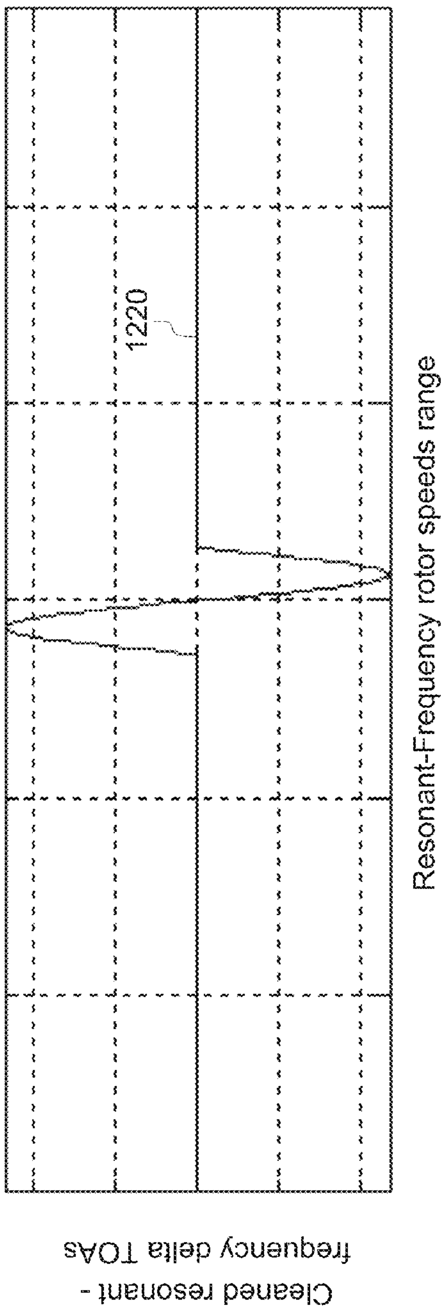
Figure 12F:
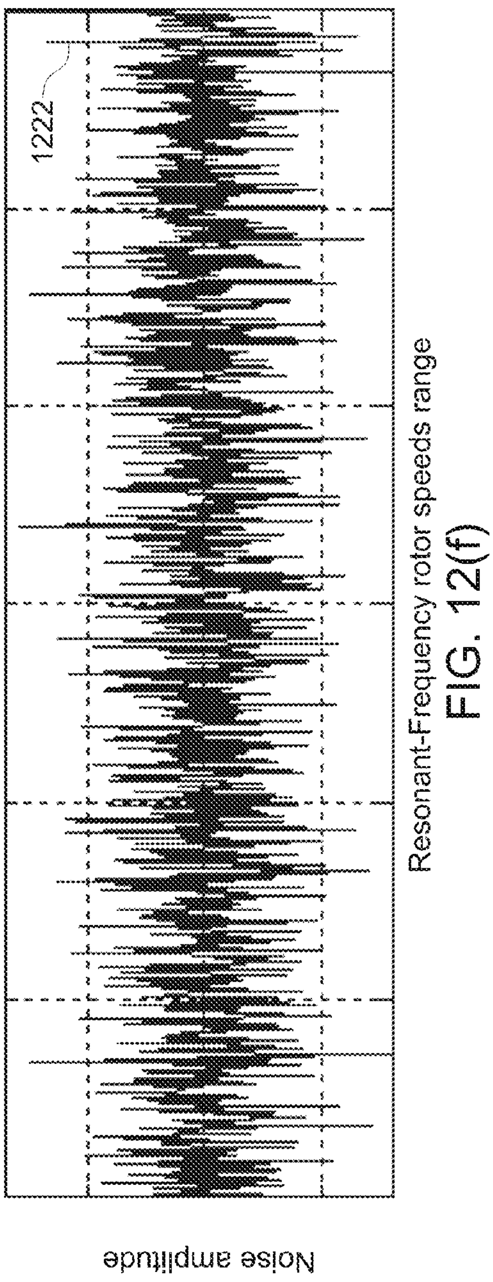

FIG. 11 is a flowchart of a method 1100 to generate a resonant matrix based upon a measurement matrix, in accordance with one embodiment of the present techniques. In one embodiment, FIG. 11 explains step 708 in FIG. 7. At block 1102, a whitened matrix is determined based upon the measurement matrix. The whitened matrix is determined by substantially removing linear correlation between entries in the measurement matrix. Particularly, the whitened matrix is determined by substantially removing linear correlation between entries in a first row of the measurement matrix and entries in a second row of the measurement matrix. Accordingly, entries in a first row of the whitened matrix and entries in a second row of the whitened matrix are linearly uncorrelated. It is noted that two signals 'x' and 'y', or two entries 'x' and 'y' are linearly uncorrelated when $E\{xy^T\}=0$, where 'E' is the expectation or mean and $xy^T$ is correlation operation. Determination of a whitened matrix by transforming the measurement matrix to the whitened matrix is explained in greater detail with reference to FIG. 13. In one embodiment, the whitened matrix comprises two rows, wherein a first row substantially comprises common observations/components of the resonant-frequency first delta TOAs vectors and the resonant-frequency second delta TOAs vectors, and a second row substantially comprises noise of the resonant-frequency first delta TOAs vectors and the resonant-frequency second delta TOAs vectors. Accordingly, the first row of the whitened matrix may be used to generate a sub-cleaned resonant frequency delta TOAs vectors signal 1104 that substantially comprises common observations/components of the resonant-frequency first delta TOAs vectors and the resonant-frequency second delta TOAs vectors. Furthermore, the second row of the whitened matrix may be used to generate a semi-noise signal 1106 that substantially comprises noise of the resonant-frequency first delta TOAs vectors and the resonant-frequency second delta TOAs vectors.

Furthermore, at block 1108, a cumulant matrix is determined based upon the whitened matrix by applying a cumulant-generating function on the whitened matrix. In one embodiment, the cumulant matrix is a fourth order cumulant matrix. In one embodiment, the cumulant matrix is a measure of independence of entries in the whitened matrix. At block 1110, a rotation matrix may be determined based upon the cumulant matrix. The rotation matrix is determined by substantially removing linear correlation between entries in the cumulant matrix. Particularly, the rotation matrix is determined by removing linear correlation between entries in a first row of the cumulant matrix and entries in a second row of the cumulant matrix. Accordingly, entries in a first row of the rotation matrix and entries in a second row of the rotation matrix are linearly uncorrelated. Determination of a rotation matrix is explained in greater detail with reference to FIG. 13.

At block 1112, a unitary matrix is determined by rotating the rotation matrix based upon the rotation matrix and a determined rotation matrix by substantially removing linear dependence between entries in the rotation matrix. At block 1114, the resonant matrix is determined by determining a product of the unitary matrix and the whitened matrix. The entries in the resonant matrix are linearly uncorrelated and linearly independent. Furthermore, the entries in the unitary matrix are linearly uncorrelated. In one embodiment, entries in a first row of the resonant matrix and entries in a second row of the resonant matrix are linearly uncorrelated and linearly independent. The resonant matrix, for example is the resonant matrix determined at block 708 in FIG. 7. The resonant matrix comprises the cleaned delta TOAs vectors 712, and the noise data 710 referred to in FIG. 7.

FIG. 12 (*a*) shows a simulated plot 1200 of a resonant-frequency first delta times of arrival vectors signal 1202 corresponding to the blade 12 and the first sensing device 14. The resonant-frequency first delta times of arrival vectors signal 1202, for example, may be the resonant-frequency first delta times of arrival vectors selected from the first delta TOAs 32 at block 702 in FIG. 7. Additionally, FIG. 12 (*b*) shows a simulated plot 1204 of a resonant-frequency second delta times of arrival vectors signal 1206 corresponding to the blade and the second sensing device 16. The resonant-frequency second delta times of arrival vectors signal 1206, for example, may be the resonant-frequency second delta times of arrival vectors selected from the second delta TOAs 34 at block 704 in FIG. 7. X-axis 1208 of the plot 1200 is representative of resonant-frequency rotor speeds range of the blade. Y-axis 1210 of the plot 1200 is representative of resonant-frequency first delta TOAs 1202. Similarly, X-axis 1212 of the plot 1204 is representative of resonant-frequency rotor speeds range of the blade. Y-axis 1214 of the plot 1204 is representative of resonant-frequency second delta TOAs 1206.

The resonant-frequency first delta times of arrival vectors signal 1202 and the resonant-frequency second delta times of arrival vectors signal 1206 are processed to form a measurement matrix using the method explained in block 706 in FIG. 7, and in FIG. 10. Furthermore, a whitened matrix is determined by transforming the measurement matrix. The whitened matrix is used to generate sub-cleaned resonant-frequency delta TOAs vectors signal 1216 and semi-noise signal 1218 shown in FIGS. 12(*c*), and 12(*d*), respectively. The sub-cleaned resonant-frequency delta TOAs vectors signal 1216 and semi-noise signal 1218 are generated using a method explained in block 1102 in FIG. 11. As shown in the sub-cleaned resonant-frequency delta TOAs vectors signal 1216, common observations of the signals 1202, 1206 (see FIG. 12(*a*), FIG. 12(*b*)) are captured in the sub-cleaned resonant-frequency delta TOAs vectors signal 1216. However, still the sub-cleaned resonant-frequency delta TOAs vectors signal 1216 has minimal remaining noise. Furthermore, as shown in FIG. 12(*d*), the noise signal 1218 contains substantial noise of the signals 1202, 1204.

Furthermore, the whitened matrix, or the signals 1216, 1218 are processed using the blocks 1108-1112 in FIG. 11 to generate a resonance signal 1220 shown in FIG. 12(*e*) and a noise signal 1222 shown in FIG. 12(*f*). The resonance signal 1220 and the noise signal 1222 are generated by using the method explained with reference to block 708 in FIG. 7 and FIG. 11. As shown in FIG. 12(*e*), common observations of the signals 1202, 1206 (see FIG. 12(*a*), FIG. 12(*b*)) are captured in the resonance signal 1220, and the noise signal 1222 has nil or zero noise. Furthermore, as shown in FIG. 12(*f*), the noise signal 1222 contains noise of the signals 1202, 1204.

Figure 13:
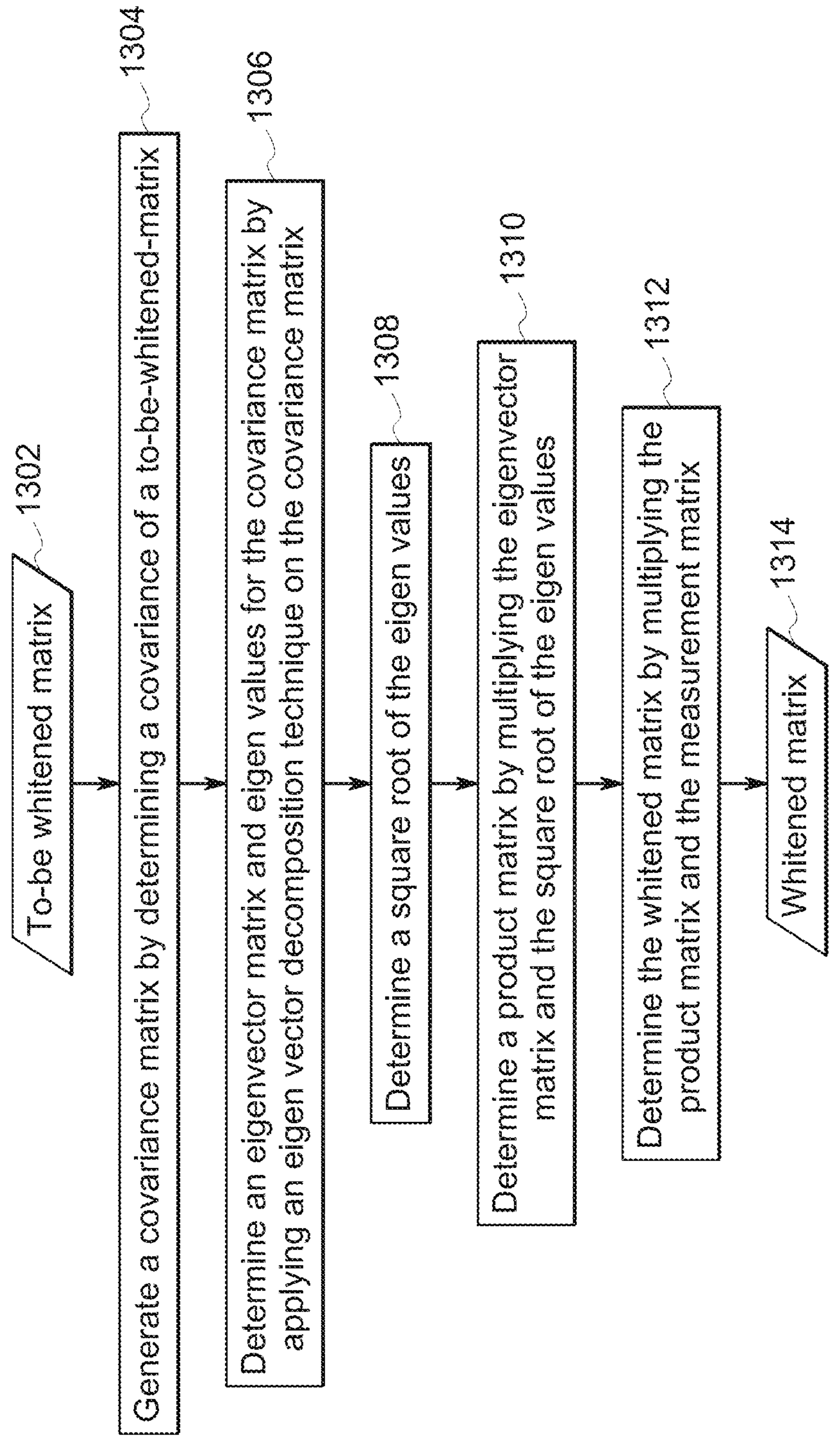
FIG. 13 is a flowchart of a method to generate a whitened matrix, in accordance with one embodiment of the present techniques.

FIG. 13 is a flowchart of a method to generate a whitened matrix 1314, in accordance with one embodiment of the present techniques. In one embodiment, FIG. 13 explains block 1102 of FIG. 11 in greater detail. In another embodiment, FIG. 13 explains block 1110 of FIG. 11 in greater detail. Reference numeral 1302 is representative of a to-be-whitened matrix. The to-be-whitened matrix 1302, for example, may be the measurement matrix referred to in block 1102 in FIG. 11, or the to-be whitened matrix 1302 may be the cumulant matrix referred to in block 1108 in FIG. 11. When the to-be-whitened matrix 1302 is the measurement matrix, the whitened matrix 1314 is the whitened matrix referred to in block 1102 of FIG. 11. When the to-be-whitened matrix 1302 is the cumulant matrix, the whitened matrix is the unitary matrix referred to in block 1110 of FIG. 11.

At block 1304, a covariance matrix is generated by determining a covariance of the to-be whitened matrix 1302. At block 1306, an Eigen value matrix and Eigen values are determined by applying an Eigen vector decomposition technique on the covariance matrix. At block 1308, a square root of the Eigen values is determined. Furthermore, at block 1310, a product matrix is determined by multiplying the Eigen Vector matrix and the square root of the Eigen values. At block 1312 the whitened matrix 1314 is determined by multiplying the product matrix and the measurement matrix.

The present systems and methods monitor the health of rotor blades by identifying resonant-frequency rotor speeds of the rotor blades when the rotor blades, a rotor containing the rotor blades and a device containing the rotor blades, and the rotor are healthy. Furthermore, the present systems and methods determine variations in the resonant-frequency rotor speeds of the rotor blades. The present systems and methods determine presence or absence of cracks in the rotor blades based on the variations in the resonant-frequency of the rotor blades.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for monitoring health of a rotor, comprising:

a first sensing device for measuring a first Blade Passing Signal (BPS) of a blade of a rotor at a reference point;

a second sensing device for measuring a second Blade Passing Signal (BPS) of the blade at the reference point; and a processing subsystem for detecting an existence of a defect in the blade by:

receiving the first BPS from the first sensing device and receiving the second BPS from the second sensing device, and determining first actual Time of Arrivals (TOAs) of the blade at the reference point and determining second actual Time of Arrivals (TOAs) of the blade at the reference point;

determining first delta TOAs based on a difference between the first actual TOAs and an expected TOA of the blade at the reference point, and determining second delta TOAs based on the second actual TOAs and the expected TOA of the blade at the reference point;

determining first delta TOAs vectors and second delta TOAs vectors based on the first delta TOAs and the second delta TOAs, respectively;

selecting resonant-frequency first delta TOAs vectors and resonant-frequency second delta TOAs vectors from the first delta TOAs and the second delta TOAs, respectively, corresponding to resonant-frequency rotor speeds regions of the blade;

generating a measurement matrix based on the resonant-frequency first delta TOAs vectors and the resonant-frequency second delta TOAs vectors;

generating a resonant matrix based on the measurement matrix; and comparing the resonant matrix to a historical resonant-frequency rotor speeds of the blade generated when there are no defects in the blade to determine an existence of a defect in the blade.

2. The system of claim 1, wherein the resonant-frequency rotor speeds regions of the blade are determined by:

generating a plurality of first frequency peak values and a plurality of second frequency peak values by iteratively shifting a first window of signals and a second window of signals along the first delta TOAs and the second delta TOAs, respectively.

3. The system of claim 1, wherein a width of the first window of signals is greater than a width of the second window of signals.

4. The system of claim 1, wherein the processing subsystem generates the plurality of first frequency peak values corresponding to the first window of signals by:

selecting a first subset of the delta TOAs contained in the first window of signals;

generating a first frequency peak value in the plurality of first frequency peak values based upon the first subset of the delta TOAs;

shifting the first window of signals along the delta TOAs to determine a shifted first window of signals;

selecting a second subset of the delta TOAs contained in the shifted first window of signals;

generating a subsequent first frequency peak value in the plurality of first frequency peak values based upon the second subset of the delta TOAs; and determining the plurality of first frequency peak values by iteratively shifting the first window of signals along the delta TOAs and selecting a respective subset of the delta TOAs, wherein the plurality of first frequency peak values is a subset of the plurality of frequency peak values.

5. The system of claim 3, wherein the shifted first window of signals does not completely overlap the first window of signals.

6. The system of claim 3, wherein the processing subsystem generates the first frequency peak value in the plurality of first frequency peak values based upon the first subset of the delta TOAs by:

determining a frequency signal corresponding to the first subset of the delta TOAs by determining a Fourier transform of the first subset of the delta TOAs;

selecting synchronous frequencies from the frequency signal; and selecting a frequency having a highest amplitude in the synchronous frequencies; and determining the first frequency peak value equal to the highest amplitude in the synchronous frequencies.

7. The system of claim 1, wherein the first and second sensors measure an arrival of a leading edge of the rotor blade.

8. The system of claim 1, wherein the first and second sensors measure an arrival of a trailing edge of the rotor blade.

9. The system of claim 1, wherein the processing subsystem preprocesses the first actual TOAs and the second actual TOAs to remove noise and asynchronous frequencies from the first actual TOAs and the second actual TOAs.

10. The system of claim 1, wherein the processing subsystem preprocesses the first actual TOAs and the second actual TOAs by applying at least one of a smoothening filtering technique and a median filtering technique to the first actual TOAs and the second actual TOAs.

11. The system of claim 1, wherein the measurement matrix is generated by applying at least one of a polynomial curve fitting technique or a wavelet based curve fitting technique to remove a trend from the initial matrix.

12. The system of claim 1, wherein the processing subsystem further determines the first delta TOAs and the second delta TOAs during a start-up state of the rotor, a transient state of the rotor, a steady state of the rotor, over-speed state of the rotor, or combinations thereof.

13. The system of claim 1, wherein the resonant matrix is determined by applying at least one of a whitening technique, a cumulant matrix estimation technique, and a matrix rotation technique.

14. The system of claim 1, wherein the resonant matrix comprises cleaned resonant-frequency delta TOAs vectors and noise data.

15. The system of claim 14, wherein the resonant matrix comprises a row of the resonant-frequency delta TOAs vectors, and another row of the noise data.

16. The system of claim 1, wherein the variation in the resonant-frequency rotor speeds of the blade with respect to the historical resonant-frequency rotor speeds of the blade is determined by applying a correlation function that results in an index value and a correlation value.

17. The system of claim 16, wherein the index value is a measurement of a phase shift between a resonance signal and a historical resonance signal.

18. The system of claim 16, wherein the correlation value is a measurement of a correlation or similarity between a resonance signal and a historical resonance signal.

19. The system of claim 16, wherein the existence of the defect is based on the index value, the correlation value and a correlation chart.

20. The system of claim 19, wherein the correlation chart comprises includes a first quadrant representing a relatively low index value and a relatively high correlation value, a second quadrant representing a relatively high index value and a relatively high correlation value, a third quadrant representing a relatively high index value and a relatively low correlation value, and a fourth quadrant representing a relatively low index value and a relatively low correlation value.

* * * * *